(12) United States Patent
Bao et al.

(10) Patent No.: US 11,877,262 B2
(45) Date of Patent: Jan. 16, 2024

(54) INTERACTION OF UPLINK AND DOWNLINK POSITIONING REFERENCE SIGNALS (PRS) WITH RESPECT TO DISCONTINUOUS RECEPTION (DRX)

(71) Applicant: QUALCOMM Incorporated, San Diego, CA (US)

(72) Inventors: Jingchao Bao, San Diego, CA (US); Sony Akkarakaran, Poway, CA (US); Juan Montojo, San Diego, CA (US); Tao Luo, San Diego, CA (US); Alexandros Manolakos, Escondido, CA (US)

(73) Assignee: QUALCOMM Incorporated, San Diego, CA (US)

( * ) Notice: Subject to any disclaimer, the term of this patent is extended or adjusted under 35 U.S.C. 154(b) by 168 days.

(21) Appl. No.: 17/399,785

(22) Filed: Aug. 11, 2021

(65) Prior Publication Data
US 2022/0053461 A1 Feb. 17, 2022

Related U.S. Application Data

(60) Provisional application No. 63/065,470, filed on Aug. 13, 2020.

(51) Int. Cl.
*H04W 72/02* (2009.01)
*H04W 76/28* (2018.01)
(Continued)

(52) U.S. Cl.
CPC ....... *H04W 72/02* (2013.01); *H04W 72/0446* (2013.01); *H04W 72/1263* (2013.01); *H04W 72/56* (2023.01); *H04W 76/28* (2018.02)

(58) Field of Classification Search
CPC ............ H04W 72/02; H04W 72/0446; H04W 72/1263; H04W 72/56; H04W 76/28; H04W 64/00; H04L 5/0048; H04L 5/0064
See application file for complete search history.

(56) References Cited

U.S. PATENT DOCUMENTS 11,012,966 B2 * 5/2021 Cui ...................... H04W 64/00
2010/0273506 A1 * 10/2010 Stern-Berkowitz .........................
G01S 5/0045
455/456.1

(Continued)

OTHER PUBLICATIONS

U.S. Appl. No. 63/061,265 Priority for US-20220045820 Aug. 5, 2020 (Year: 2020).*

(Continued)

*Primary Examiner* — Rina C Pancholi
(74) *Attorney, Agent, or Firm* — MG-IP Law, P.C.

(57) ABSTRACT

Disclosed are various techniques for wireless communication. In an aspect, a user equipment (UE) configured to operate in discontinuous reception (DRX) mode receives a configuration of a plurality of first positioning reference signal (PRS) resources, receives a configuration of a plurality of second PRS resources, selects one or more pairs of a first PRS resource of the plurality of first PRS resources and a second PRS resource of the plurality of second PRS resources, each pair of the one or more pairs satisfying one or more DRX pruning rules and one or more bundling conditions, and receives or transmitting the first PRS resource and transmitting or receiving the second PRS resource during one or more DRX cycles of the DRX mode.

30 Claims, 14 Drawing Sheets

(51) Int. Cl.
 *H04W 72/0446* (2023.01)
 *H04W 72/1263* (2023.01)
 *H04W 72/56* (2023.01)

(56) References Cited

U.S. PATENT DOCUMENTS

| | | | |
|---|---|---|---|
| 2018/0295581 A1* | 10/2018 | Krishnamoorthy | ............................ H04W 52/0241 |
| 2019/0182794 A1* | 6/2019 | Wong | ................ H04W 52/0216 |
| 2019/0327673 A1* | 10/2019 | Bitra | ........................ G01S 5/10 |
| 2019/0373573 A1* | 12/2019 | Cui | ........................... G01S 5/10 |
| 2020/0235877 A1* | 7/2020 | Manolakos | ............ H04W 4/029 |
| 2021/0050978 A1* | 2/2021 | Manolakos | ............ H04L 5/0048 |
| 2021/0360733 A1* | 11/2021 | Bao | ................... H04W 52/0216 |
| 2021/0385766 A1* | 12/2021 | Manolakos | ............ H04W 64/00 |
| 2021/0410063 A1* | 12/2021 | Bao | ........................ G01S 5/011 |
| 2021/0410098 A1* | 12/2021 | Bao | ..................... H04W 52/028 |
| 2022/0045820 A1* | 2/2022 | Cui | ........................ H04L 5/0091 |
| 2022/0116089 A1* | 4/2022 | Khoryaev | ............ H04B 7/0695 |
| 2022/0272731 A1* | 8/2022 | Cha | ..................... H04J 13/0025 |
| 2023/0067569 A1* | 3/2023 | Manolakos | ............ H04W 64/00 |

OTHER PUBLICATIONS

International Search Report and Written Opinion—PCT/US2021/045799—ISA/EPO—dated Nov. 23, 2021.
Qualcomm Incorporated: "Initial Thoughts on Potential Positioning Enhancements", 3GPP Draft, 3GPP TSG RAN WG1 #101-e, R1-2004492, 3rd Generation Partnership Project (3GPP), Mobile Competence Centre, 650, Route Des Lucioles, F-06921 Sophia-Antipolis Cedex, France, vol. RAN WG1, No. e-meeting, May 25, 2020-Jun. 5, 2020, May 16, 2020 (May 16, 2020), XP051886221, 14 Pages, Retrieved from Internet: URL: https://ftp.3gpp.org/tsg_ran/WG1_RL1/TSGR1_101-e/Docs/R1-2004492.zip R1-2004492.docx [Retrieved May 16, 2020],Secs 1-7,p. 13,Line 7-Line 27, p. 10.

* cited by examiner

INTERACTION OF UPLINK AND DOWNLINK POSITIONING REFERENCE SIGNALS (PRS) WITH RESPECT TO DISCONTINUOUS RECEPTION (DRX)

CROSS-REFERENCE TO RELATED APPLICATIONS

The present application for patent claims the benefit of U.S. Provisional Application No. 63/065,470, entitled "INTERACTION OF UPLINK AND DOWNLINK POSITIONING REFERENCE SIGNALS (PRS) WITH RESPECT TO DISCONTINOUS RECEPTION (DRX)," filed Aug. 13, 2020, assigned to the assignee hereof, and expressly incorporated herein by reference in its entirety.

BACKGROUND OF THE DISCLOSURE

1. Field of the Disclosure

Aspects of the disclosure relate generally to wireless communications.

2. Description of the Related Art

Wireless communication systems have developed through various generations, including a first-generation analog wireless phone service (1G), a second-generation (2G) digital wireless phone service (including interim 2.5G and 2.75G networks), a third-generation (3G) high speed data, Internet-capable wireless service and a fourth-generation (4G) service (e.g., Long Term Evolution (LTE) or WiMax). There are presently many different types of wireless communication systems in use, including cellular and personal communications service (PCS) systems. Examples of known cellular systems include the cellular analog advanced mobile phone system (AMPS), and digital cellular systems based on code division multiple access (CDMA), frequency division multiple access (FDMA), time division multiple access (TDMA), the Global System for Mobile communications (GSM), etc.

A fifth generation (5G) wireless standard, referred to as New Radio (NR), calls for higher data transfer speeds, greater numbers of connections, and better coverage, among other improvements. The 5G standard, according to the Next Generation Mobile Networks Alliance, is designed to provide data rates of several tens of megabits per second to each of tens of thousands of users, with 1 gigabit per second to tens of workers on an office floor. Several hundreds of thousands of simultaneous connections should be supported in order to support large sensor deployments. Consequently, the spectral efficiency of 5G mobile communications should be significantly enhanced compared to the current 4G standard. Furthermore, signaling efficiencies should be enhanced and latency should be substantially reduced compared to current standards.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method of wireless communication performed by a user equipment (UE) configured to operate in discontinuous reception (DRX) mode includes receiving a configuration of a plurality of first positioning reference signal (PRS) resources; receiving a configuration of a plurality of second PRS resources; selecting one or more pairs of a first PRS resource of the plurality of first PRS resources and a second PRS resource of the plurality of second PRS resources, each pair of the one or more pairs satisfying one or more DRX pruning rules and one or more bundling conditions; and receiving or transmitting the first PRS resource and transmitting or receiving the second PRS resource during one or more DRX cycles of the DRX mode.

In an aspect, a user equipment (UE) includes a memory; at least one transceiver; and at least one processor communicatively coupled to the memory and the at least one transceiver, the at least one processor configured to: receive, via the at least one transceiver, a configuration of a plurality of first positioning reference signal (PRS) resources; receive, via the at least one transceiver, a configuration of a plurality of second PRS resources; select one or more pairs of a first PRS resource of the plurality of first PRS resources and a second PRS resource of the plurality of second PRS resources, each pair of the one or more pairs satisfying one or more DRX pruning rules and one or more bundling conditions; and receive or transmit, via the at least one transceiver, the first PRS resource and transmit or receive, via the at least one transceiver, the second PRS resource during one or more DRX cycles of the DRX mode.

In an aspect, a user equipment (UE) includes means for receiving a configuration of a plurality of first positioning reference signal (PRS) resources; means for receiving a configuration of a plurality of second PRS resources; means for selecting one or more pairs of a first PRS resource of the plurality of first PRS resources and a second PRS resource of the plurality of second PRS resources, each pair of the one or more pairs satisfying one or more DRX pruning rules and one or more bundling conditions; and means for receiving or transmitting the first PRS resource and means for transmitting or receiving the second PRS resource during one or more DRX cycles of the DRX mode.

In an aspect, a non-transitory computer-readable medium storing computer-executable instructions that, when executed by a user equipment (UE), cause the UE to: receive a configuration of a plurality of first positioning reference signal (PRS) resources; receive a configuration of a plurality of second PRS resources; select one or more pairs of a first PRS resource of the plurality of first PRS resources and a second PRS resource of the plurality of second PRS resources, each pair of the one or more pairs satisfying one or more DRX pruning rules and one or more bundling conditions; and receive or transmit the first PRS resource and transmit or receive the second PRS resource during one or more DRX cycles of the DRX mode.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
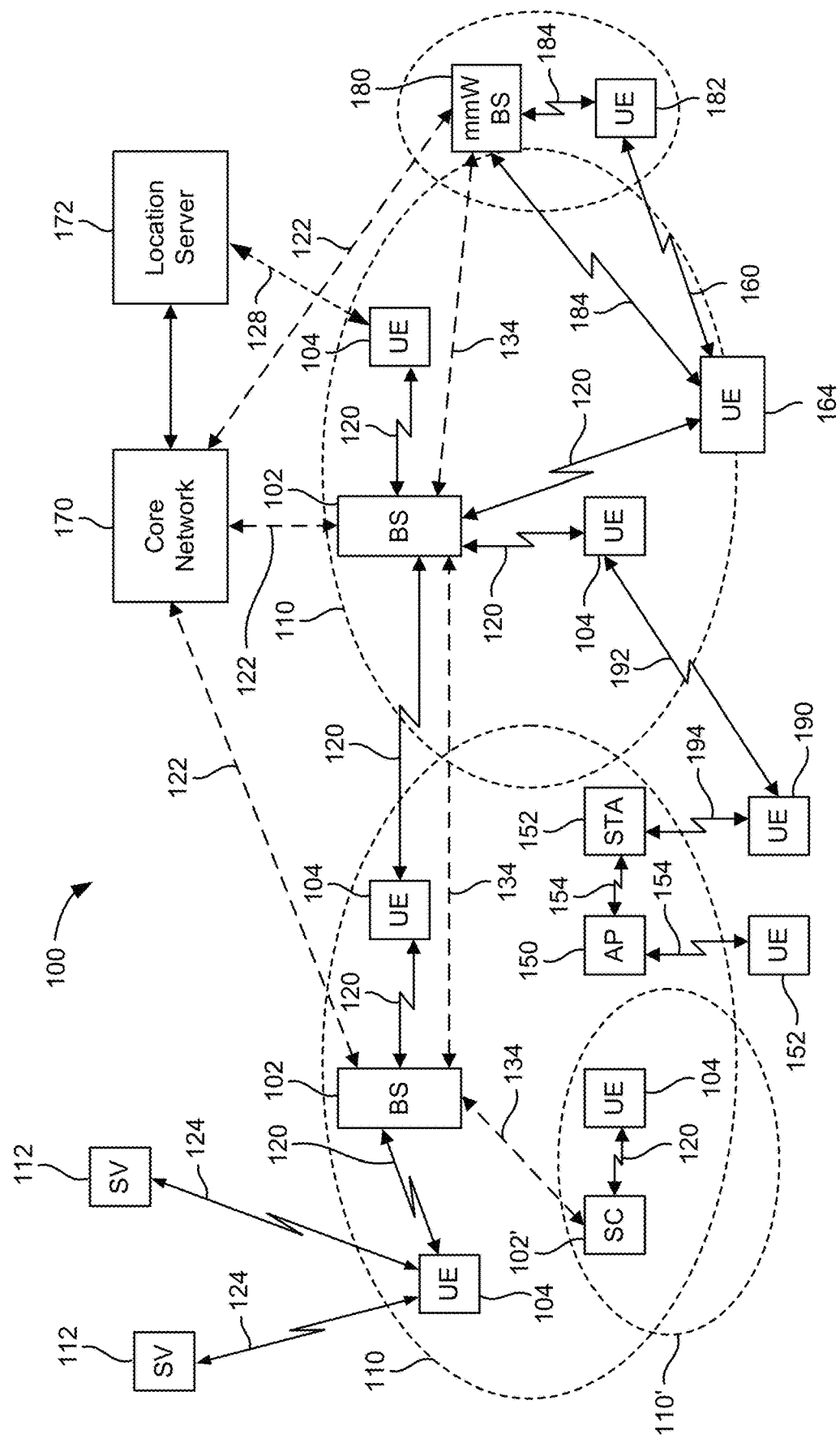
FIG. 1 illustrates an example wireless communications system, according to aspects of the disclosure.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular radio access technology (RAT), unless otherwise noted. In general, a UE may be any wireless communication device (e.g., a mobile phone, router, tablet computer, laptop computer, consumer asset locating device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a radio access network (RAN). As used herein, the term "UE" may be referred to interchangeably as an "access terminal" or "AT," a "client device," a "wireless device," a "subscriber device," a "subscriber terminal," a "subscriber station," a "user terminal" or "UT," a "mobile device," a "mobile terminal," a "mobile station," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on the Institute of Electrical and Electronics Engineers (IEEE) 802.11 specification, etc.) and so on.

A base station may operate according to one of several RATs in communication with UEs depending on the network in which it is deployed, and may be alternatively referred to as an access point (AP), a network node, a NodeB, an evolved NodeB (eNB), a next generation eNB (ng-eNB), a New Radio (NR) Node B (also referred to as a gNB or gNodeB), etc. A base station may be used primarily to support wireless access by UEs, including supporting data, voice, and/or signaling connections for the supported UEs. In some systems a base station may provide purely edge node signaling functions while in other systems it may provide additional control and/or network management functions. A communication link through which UEs can send signals to a base station is called an uplink (UL) channel (e.g., a reverse traffic channel, a reverse control channel, an access channel, etc.). A communication link through which the base station can send signals to UEs is called a downlink (DL) or forward link channel (e.g., a paging channel, a control channel, a broadcast channel, a forward traffic channel, etc.). As used herein the term traffic channel (TCH) can refer to either an uplink/reverse or downlink/forward traffic channel.

The term "base station" may refer to a single physical transmission-reception point (TRP) or to multiple physical TRPs that may or may not be co-located. For example, where the term "base station" refers to a single physical TRP, the physical TRP may be an antenna of the base station corresponding to a cell (or several cell sectors) of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring. Because a TRP is the point from which a base station transmits and receives wireless signals, as used herein, references to transmission from or reception at a base station are to be understood as referring to a particular TRP of the base station.

In some implementations that support positioning of UEs, a base station may not support wireless access by UEs (e.g., may not support data, voice, and/or signaling connections for UEs), but may instead transmit reference signals to UEs to be measured by the UEs, and/or may receive and measure signals transmitted by the UEs. Such a base station may be referred to as a positioning beacon (e.g., when transmitting signals to UEs) and/or as a location measurement unit (e.g., when receiving and measuring signals from UEs).

An "RF signal" comprises an electromagnetic wave of a given frequency that transports information through the space between a transmitter and a receiver. As used herein, a transmitter may transmit a single "RF signal" or multiple "RF signals" to a receiver. However, the receiver may receive multiple "RF signals" corresponding to each transmitted RF signal due to the propagation characteristics of RF signals through multipath channels. The same transmitted RF signal on different paths between the transmitter and receiver may be referred to as a "multipath" RF signal. As used herein, an RF signal may also be referred to as a "wireless signal" or simply a "signal" where it is clear from the context that the term "signal" refers to a wireless signal or an RF signal.

FIG. 1 illustrates an example wireless communications system 100, according to aspects of the disclosure. The wireless communications system 100 (which may also be referred to as a wireless wide area network (WWAN)) may include various base stations 102 (labeled "BS") and various UEs 104. The base stations 102 may include macro cell base stations (high power cellular base stations) and/or small cell base stations (low power cellular base stations). In an aspect, the macro cell base stations may include eNBs and/or ng-eNBs where the wireless communications system 100 corresponds to an LTE network, or gNBs where the wireless communications system 100 corresponds to a NR network, or a combination of both, and the small cell base stations may include femtocells, picocells, microcells, etc.

The base stations 102 may collectively form a RAN and interface with a core network 170 (e.g., an evolved packet core (EPC) or a 5G core (5GC)) through backhaul links 122, and through the core network 170 to one or more location servers 172 (e.g., a location management function (LMF) or a secure user plane location (SUPL) location platform (SLP)). The location server(s) 172 may be part of core network 170 or may be external to core network 170. A location server 172 may be integrated with a base station 102. A UE 104 may communicate with a location server 172 directly or indirectly. For example, a UE 104 may communicate with a location server 172 via the base station 102 that is currently serving that UE 104. A UE 104 may also communicate with a location server 172 through another path, such as via an application server (not shown), via another network, such as via a wireless local area network (WLAN) access point (AP) (e.g., AP 150 described below), and so on. For signaling purposes, communication between a UE 104 and a location server 172 may be represented as an indirect connection (e.g., through the core network 170, etc.) or a direct connection (e.g., as shown via direct connection 128), with the intervening nodes (if any) omitted from a signaling diagram for clarity.

In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/5GC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each geographic coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCI), an enhanced cell identifier (ECI), a virtual cell identifier (VCI), a cell global identifier (CGI), etc.) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. Because a cell is supported by a specific base station, the term "cell" may refer to either or both of the logical communication entity and the base station that supports it, depending on the context. In addition, because a TRP is typically the physical transmission point of a cell, the terms "cell" and "TRP" may be used interchangeably. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' (labeled "SC" for "small cell") may have a geographic coverage area 110' that substantially overlaps with the geographic coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include uplink (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to downlink and uplink (e.g., more or less carriers may be allocated for downlink than for uplink).

The wireless communications system 100 may further include a wireless local area network (WLAN) access point (AP) 150 in communication with WLAN stations (STAs) 152 via communication links 154 in an unlicensed frequency spectrum (e.g., 5 GHz). When communicating in an unlicensed frequency spectrum, the WLAN STAs 152 and/or the WLAN AP 150 may perform a clear channel assessment (CCA) or listen before talk (LBT) procedure prior to communicating in order to determine whether the channel is available.

The small cell base station 102' may operate in a licensed and/or an unlicensed frequency spectrum. When operating in an unlicensed frequency spectrum, the small cell base station 102' may employ LTE or NR technology and use the same 5 GHz unlicensed frequency spectrum as used by the WLAN AP 150. The small cell base station 102', employing LTE/5G in an unlicensed frequency spectrum, may boost coverage to and/or increase capacity of the access network. NR in unlicensed spectrum may be referred to as NR-U. LTE in an unlicensed spectrum may be referred to as LTE-U, licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

Transmit beamforming is a technique for focusing an RF signal in a specific direction. Traditionally, when a network node (e.g., a base station) broadcasts an RF signal, it broadcasts the signal in all directions (omni-directionally). With transmit beamforming, the network node determines where a given target device (e.g., a UE) is located (relative to the transmitting network node) and projects a stronger downlink RF signal in that specific direction, thereby providing a faster (in terms of data rate) and stronger RF signal for the receiving device(s). To change the directionality of the RF signal when transmitting, a network node can control the phase and relative amplitude of the RF signal at each of the one or more transmitters that are broadcasting the RF signal. For example, a network node may use an array of antennas (referred to as a "phased array" or an "antenna array") that creates a beam of RF waves that can be "steered" to point in different directions, without actually moving the antennas. Specifically, the RF current from the transmitter is fed to the individual antennas with the correct phase relationship so that the radio waves from the separate antennas add together to increase the radiation in a desired direction, while cancelling to suppress radiation in undesired directions.

Transmit beams may be quasi-co-located, meaning that they appear to the receiver (e.g., a UE) as having the same parameters, regardless of whether or not the transmitting antennas of the network node themselves are physically co-located. In NR, there are four types of quasi-co-location (QCL) relations. Specifically, a QCL relation of a given type means that certain parameters about a second reference RF signal on a second beam can be derived from information about a source reference RF signal on a source beam. Thus, if the source reference RF signal is QCL Type A, the receiver can use the source reference RF signal to estimate the Doppler shift, Doppler spread, average delay, and delay spread of a second reference RF signal transmitted on the same channel. If the source reference RF signal is QCL Type B, the receiver can use the source reference RF signal to estimate the Doppler shift and Doppler spread of a second reference RF signal transmitted on the same channel. If the source reference RF signal is QCL Type C, the receiver can use the source reference RF signal to estimate the Doppler shift and average delay of a second reference RF signal transmitted on the same channel. If the source reference RF signal is QCL Type D, the receiver can use the source reference RF signal to estimate the spatial receive parameter of a second reference RF signal transmitted on the same channel.

In receive beamforming, the receiver uses a receive beam to amplify RF signals detected on a given channel. For example, the receiver can increase the gain setting and/or adjust the phase setting of an array of antennas in a particular direction to amplify (e.g., to increase the gain level of) the RF signals received from that direction. Thus, when a receiver is said to beamform in a certain direction, it means the beam gain in that direction is high relative to the beam gain along other directions, or the beam gain in that direction is the highest compared to the beam gain in that direction of all other receive beams available to the receiver. This results in a stronger received signal strength (e.g., reference signal received power (RSRP), reference signal received quality (RSRQ), signal-to-interference-plus-noise ratio (SINR), etc.) of the RF signals received from that direction.

Transmit and receive beams may be spatially related. A spatial relation means that parameters for a second beam (e.g., a transmit or receive beam) for a second reference signal can be derived from information about a first beam (e.g., a receive beam or a transmit beam) for a first reference signal. For example, a UE may use a particular receive beam to receive a reference downlink reference signal (e.g., synchronization signal block (SSB)) from a base station. The UE can then form a transmit beam for sending an uplink reference signal (e.g., sounding reference signal (SRS)) to that base station based on the parameters of the receive beam.

Note that a "downlink" beam may be either a transmit beam or a receive beam, depending on the entity forming it. For example, if a base station is forming the downlink beam to transmit a reference signal to a UE, the downlink beam is a transmit beam. If the UE is forming the downlink beam, however, it is a receive beam to receive the downlink reference signal. Similarly, an "uplink" beam may be either a transmit beam or a receive beam, depending on the entity forming it. For example, if a base station is forming the uplink beam, it is an uplink receive beam, and if a UE is forming the uplink beam, it is an uplink transmit beam.

The electromagnetic spectrum is often subdivided, based on frequency/wavelength, into various classes, bands, channels, etc. In 5G NR two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above aspects in mind, unless specifically stated otherwise, it should be understood that the term "sub-6 GHz" or the like if used herein may broadly represent frequencies that may be less than 6 GHz, may be within FR1, or may include mid-band frequencies. Further, unless specifically stated otherwise, it should be understood that the term "millimeter wave" or the like if used herein may broadly represent frequencies that may include mid-band frequencies, may be within FR2, FR4, FR4-a or FR4-1, and/or FR5, or may be within the EHF band.

In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels, and may be a carrier in a licensed frequency (however, this is not always the case). A secondary carrier is a carrier operating on a second frequency (e.g., FR2) that may be configured once the RRC connection is established between the UE 104 and the anchor carrier and that may be used to provide additional radio resources. In some cases, the secondary carrier may be a carrier in an unlicensed frequency. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably.

For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include a UE 164 that may communicate with a macro cell base station 102 over a communication link 120 and/or the mmW base station 180 over a mmW communication link 184. For example, the macro cell base station 102 may support a PCell and one or more S Cells for the UE 164 and the mmW base station 180 may support one or more SCells for the UE 164.

In some cases, the UE 164 and the UE 182 may be capable of sidelink communication. Sidelink-capable UEs (SL-UEs) may communicate with base stations 102 over communication links 120 using the Uu interface (i.e., the air interface between a UE and a base station). SL-UEs (e.g., UE 164, UE 182) may also communicate directly with each other over a wireless sidelink 160 using the PC5 interface (i.e., the air interface between sidelink-capable UEs). A wireless sidelink (or just "sidelink") is an adaptation of the core cellular (e.g., LTE, NR) standard that allows direct communication between two or more UEs without the communication needing to go through a base station. Sidelink communication may be unicast or multicast, and may be used for device-to-device (D2D) media-sharing, vehicle-to-vehicle (V2V) communication, vehicle-to-everything (V2X) communication (e.g., cellular V2X (cV2X) communication, enhanced V2X (eV2X) communication, etc.), emergency rescue applications, etc. One or more of a group of SL-UEs utilizing sidelink communications may be within the geographic coverage area 110 of a base station 102. Other SL-UEs in such a group may be outside the geographic coverage area 110 of a base station 102 or be otherwise unable to receive transmissions from a base station 102. In some cases, groups of SL-UEs communicating via sidelink communications may utilize a one-to-many (1:M) system in which each SL-UE transmits to every other SL-UE in the group. In some cases, a base station 102 facilitates the scheduling of resources for sidelink communications. In other cases, sidelink communications are carried out between SL-UEs without the involvement of a base station 102.

In an aspect, the sidelink 160 may operate over a wireless communication medium of interest, which may be shared with other wireless communications between other vehicles and/or infrastructure access points, as well as other RATs. A "medium" may be composed of one or more time, frequency, and/or space communication resources (e.g., encompassing one or more channels across one or more carriers) associated with wireless communication between one or more transmitter/receiver pairs. In an aspect, the medium of interest may correspond to at least a portion of an unlicensed frequency band shared among various RATs. Although different licensed frequency bands have been reserved for certain communication systems (e.g., by a government entity such as the Federal Communications Commission (FCC) in the United States), these systems, in particular those employing small cell access points, have recently extended operation into unlicensed frequency bands such as the Unlicensed National Information Infrastructure (U-NII) band used by wireless local area network (WLAN) technologies, most notably IEEE 802.11x WLAN technologies generally referred to as "Wi-Fi." Example systems of this type include different variants of CDMA systems, TDMA systems, FDMA systems, orthogonal FDMA (OFDMA) systems, single-carrier FDMA (SC-FDMA) systems, and so on.

Note that although FIG. 1 only illustrates two of the UEs as SL-UEs (i.e., UEs 164 and 182), any of the illustrated UEs may be SL-UEs. Further, although only UE 182 was described as being capable of beamforming, any of the illustrated UEs, including UE 164, may be capable of beamforming. Where SL-UEs are capable of beamforming, they may beamform towards each other (i.e., towards other SL-UEs), towards other UEs (e.g., UEs 104), towards base stations (e.g., base stations 102, 180, small cell 102', access point 150), etc. Thus, in some cases, UEs 164 and 182 may utilize beamforming over sidelink 160.

In the example of FIG. 1, any of the illustrated UEs (shown in FIG. 1 as a single UE 104 for simplicity) may receive signals 124 from one or more Earth orbiting space vehicles (SVs) 112 (e.g., satellites). In an aspect, the SVs 112 may be part of a satellite positioning system that a UE 104 can use as an independent source of location information. A satellite positioning system typically includes a system of transmitters (e.g., SVs 112) positioned to enable receivers (e.g., UEs 104) to determine their location on or above the Earth based, at least in part, on positioning signals (e.g., signals 124) received from the transmitters. Such a transmitter typically transmits a signal marked with a repeating pseudo-random noise (PN) code of a set number of chips. While typically located in SVs 112, transmitters may sometimes be located on ground-based control stations, base stations 102, and/or other UEs 104. A UE 104 may include one or more dedicated receivers specifically designed to receive signals 124 for deriving geo location information from the SVs 112.

In a satellite positioning system, the use of signals 124 can be augmented by various satellite-based augmentation systems (SBAS) that may be associated with or otherwise enabled for use with one or more global and/or regional navigation satellite systems. For example an SBAS may include an augmentation system(s) that provides integrity information, differential corrections, etc., such as the Wide Area Augmentation System (WAAS), the European Geostationary Navigation Overlay Service (EGNOS), the Multi-functional Satellite Augmentation System (MSAS), the Global Positioning System (GPS) Aided Geo Augmented Navigation or GPS and Geo Augmented Navigation system (GAGAN), and/or the like. Thus, as used herein, a satellite positioning system may include any combination of one or more global and/or regional navigation satellites associated with such one or more satellite positioning systems.

In an aspect, SVs 112 may additionally or alternatively be part of one or more non-terrestrial networks (NTNs). In an NTN, an SV 112 is connected to an earth station (also referred to as a ground station, NTN gateway, or gateway), which in turn is connected to an element in a 5G network, such as a modified base station 102 (without a terrestrial antenna) or a network node in a 5GC. This element would in turn provide access to other elements in the 5G network and ultimately to entities external to the 5G network, such as Internet web servers and other user devices. In that way, a UE 104 may receive communication signals (e.g., signals 124) from an SV 112 instead of, or in addition to, communication signals from a terrestrial base station 102.

The wireless communications system 100 may further include one or more UEs, such as UE 190, that connects indirectly to one or more communication networks via one or more device-to-device (D2D) peer-to-peer (P2P) links (referred to as "sidelinks"). In the example of FIG. 1, UE 190 has a D2D P2P link 192 with one of the UEs 104 connected to one of the base stations 102 (e.g., through which UE 190 may indirectly obtain cellular connectivity) and a D2D P2P link 194 with WLAN STA 152 connected to the WLAN AP 150 (through which UE 190 may indirectly obtain WLAN-based Internet connectivity). In an example, the D2D P2P links 192 and 194 may be supported with any well-known D2D RAT, such as LTE Direct (LTE-D), WiFi Direct (WiFi-D), Bluetooth®, and so on.

Figure 2A:
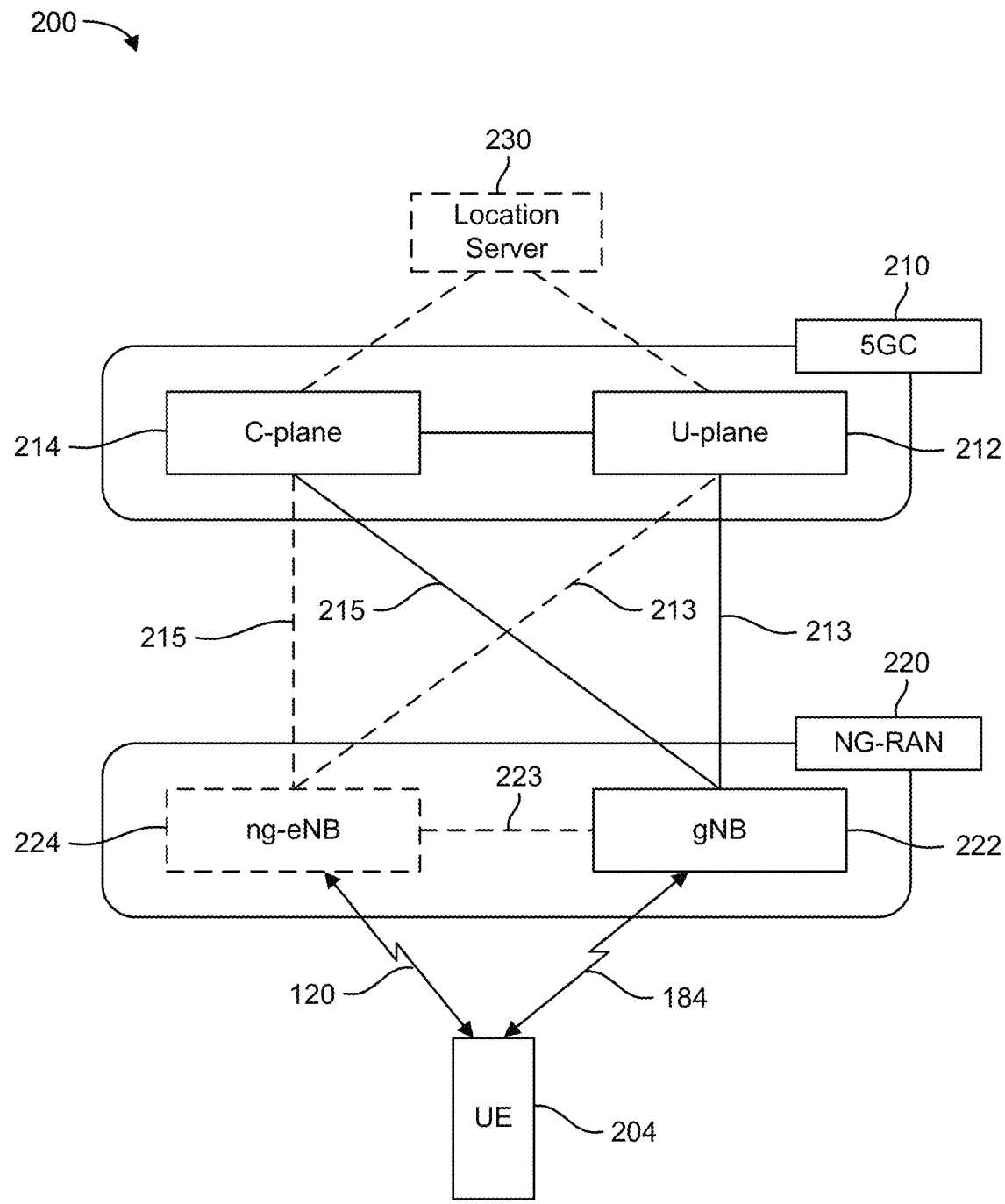
FIGS. 2A and 2B illustrate example wireless network structures, according to aspects of the disclosure.

FIG. 2A illustrates an example wireless network structure 200. For example, a 5GC 210 (also referred to as a Next Generation Core (NGC)) can be viewed functionally as control plane (C-plane) functions 214 (e.g., UE registration, authentication, network access, gateway selection, etc.) and user plane (U-plane) functions 212, (e.g., UE gateway function, access to data networks, IP routing, etc.) which operate cooperatively to form the core network. User plane interface (NG-U) 213 and control plane interface (NG-C) 215 connect the gNB 222 to the 5GC 210 and specifically to the user plane functions 212 and control plane functions 214, respectively. In an additional configuration, an ng-eNB 224 may also be connected to the 5GC 210 via NG-C 215 to the control plane functions 214 and NG-U 213 to user plane functions 212. Further, ng-eNB 224 may directly communicate with gNB 222 via a backhaul connection 223. In some configurations, a Next Generation RAN (NG-RAN) 220 may have one or more gNBs 222, while other configurations include one or more of both ng-eNBs 224 and gNBs 222. Either (or both) gNB 222 or ng-eNB 224 may communicate with one or more UEs 204 (e.g., any of the UEs described herein).

Another optional aspect may include a location server 230, which may be in communication with the 5GC 210 to provide location assistance for UE(s) 204. The location server 230 can be implemented as a plurality of separate servers (e.g., physically separate servers, different software modules on a single server, different software modules spread across multiple physical servers, etc.), or alternately may each correspond to a single server. The location server 230 can be configured to support one or more location services for UEs 204 that can connect to the location server 230 via the core network, 5GC 210, and/or via the Internet (not illustrated). Further, the location server 230 may be integrated into a component of the core network, or alternatively may be external to the core network (e.g., a third party server, such as an original equipment manufacturer (OEM) server or service server).

Figure 2B:
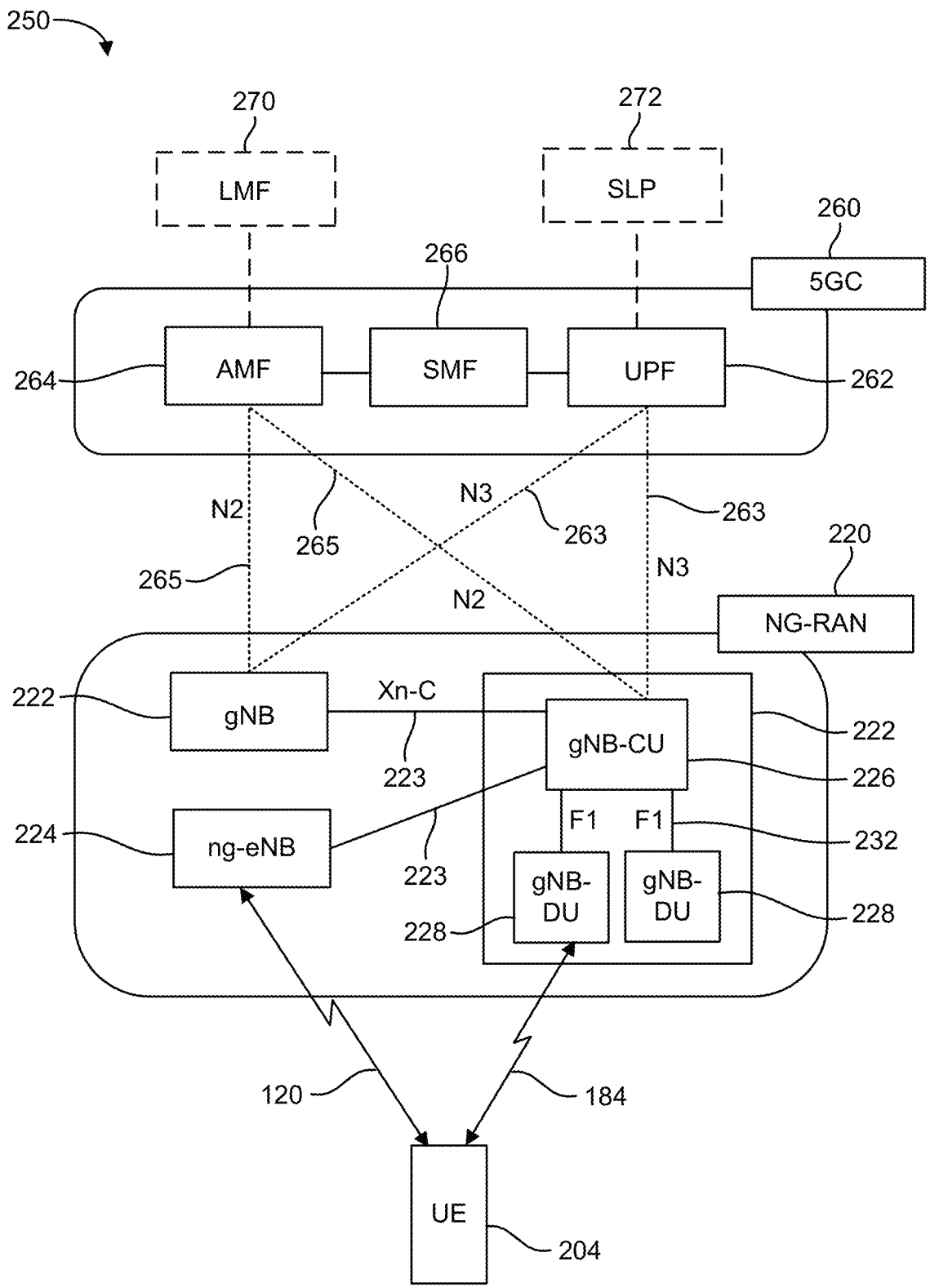

FIG. 2B illustrates another example wireless network structure 250. A 5GC 260 (which may correspond to 5GC 210 in FIG. 2A) can be viewed functionally as control plane functions, provided by an access and mobility management function (AMF) 264, and user plane functions, provided by a user plane function (UPF) 262, which operate cooperatively to form the core network (i.e., 5GC 260). The functions of the AMF 264 include registration management, connection management, reachability management, mobility management, lawful interception, transport for session management (SM) messages between one or more UEs 204 (e.g., any of the UEs described herein) and a session management function (SMF) 266, transparent proxy services for routing SM messages, access authentication and access authorization, transport for short message service (SMS) messages between the UE 204 and the short message service function (SMSF) (not shown), and security anchor functionality (SEAF). The AMF 264 also interacts with an authentication server function (AUSF) (not shown) and the UE 204, and receives the intermediate key that was established as a result of the UE 204 authentication process. In the case of authentication based on a UMTS (universal mobile telecommunications system) subscriber identity module (USIM), the AMF 264 retrieves the security material from the AUSF. The functions of the AMF 264 also include security context management (SCM). The SCM receives a key from the SEAF that it uses to derive access-network specific keys. The functionality of the AMF 264 also includes location services management for regulatory services, transport for location services messages between the UE 204 and a location management function (LMF) 270 (which acts as a location server 230), transport for location services messages between the NG-RAN 220 and the LMF 270, evolved packet system (EPS) bearer identifier allocation for interworking with the EPS, and UE 204 mobility event notification. In addition, the AMF 264 also supports functionalities for non-3GPP (Third Generation Partnership Project) access networks.

Functions of the UPF 262 include acting as an anchor point for intra-/inter-RAT mobility (when applicable), acting as an external protocol data unit (PDU) session point of interconnect to a data network (not shown), providing packet routing and forwarding, packet inspection, user plane policy rule enforcement (e.g., gating, redirection, traffic steering), lawful interception (user plane collection), traffic usage reporting, quality of service (QoS) handling for the user plane (e.g., uplink/downlink rate enforcement, reflective QoS marking in the downlink), uplink traffic verification (service data flow (SDF) to QoS flow mapping), transport level packet marking in the uplink and downlink, downlink packet buffering and downlink data notification triggering, and sending and forwarding of one or more "end markers" to the source RAN node. The UPF 262 may also support transfer of location services messages over a user plane between the UE 204 and a location server, such as an SLP 272.

The functions of the SMF 266 include session management, UE Internet protocol (IP) address allocation and management, selection and control of user plane functions, configuration of traffic steering at the UPF 262 to route traffic to the proper destination, control of part of policy enforcement and QoS, and downlink data notification. The interface over which the SMF 266 communicates with the AMF 264 is referred to as the N11 interface.

Another optional aspect may include an LMF 270, which may be in communication with the 5GC 260 to provide location assistance for UEs 204. The LMF 270 can be implemented as a plurality of separate servers (e.g., physically separate servers, different software modules on a single server, different software modules spread across multiple physical servers, etc.), or alternately may each correspond to a single server. The LMF 270 can be configured to support one or more location services for UEs 204 that can connect to the LMF 270 via the core network, 5GC 260, and/or via the Internet (not illustrated). The SLP 272 may support similar functions to the LMF 270, but whereas the LMF 270 may communicate with the AMF 264, NG-RAN 220, and UEs 204 over a control plane (e.g., using interfaces and protocols intended to convey signaling messages and not voice or data), the SLP 272 may communicate with UEs 204 and external clients (not shown in FIG. 2B) over a user plane (e.g., using protocols intended to carry voice and/or data like the transmission control protocol (TCP) and/or IP).

User plane interface 263 and control plane interface 265 connect the 5GC 260, and specifically the UPF 262 and AMF 264, respectively, to one or more gNBs 222 and/or ng-eNBs 224 in the NG-RAN 220. The interface between gNB(s) 222 and/or ng-eNB(s) 224 and the AMF 264 is referred to as the "N2" interface, and the interface between gNB(s) 222 and/or ng-eNB(s) 224 and the UPF 262 is referred to as the "N3" interface. The gNB(s) 222 and/or ng-eNB(s) 224 of the NG-RAN 220 may communicate directly with each other via backhaul connections 223, referred to as the "Xn-C" interface. One or more of gNBs 222 and/or ng-eNBs 224 may communicate with one or more UEs 204 over a wireless interface, referred to as the "Uu" interface.

The functionality of a gNB 222 is divided between a gNB central unit (gNB-CU) 226 and one or more gNB distributed units (gNB-DUs) 228. The interface 232 between the gNB-CU 226 and the one or more gNB-DUs 228 is referred to as the "F1" interface. A gNB-CU 226 is a logical node that includes the base station functions of transferring user data, mobility control, radio access network sharing, positioning, session management, and the like, except for those functions allocated exclusively to the gNB-DU(s) 228. More specifically, the gNB-CU 226 hosts the radio resource control (RRC), service data adaptation protocol (SDAP), and packet data convergence protocol (PDCP) protocols of the gNB 222. A gNB-DU 228 is a logical node that hosts the radio link control (RLC), medium access control (MAC), and physical (PHY) layers of the gNB 222. Its operation is controlled by the gNB-CU 226. One gNB-DU 228 can support one or more cells, and one cell is supported by only one gNB-DU 228. Thus, a UE 204 communicates with the gNB-CU 226 via the RRC, SDAP, and PDCP layers and with a gNB-DU 228 via the RLC, MAC, and PHY layers.

Figure 3A:
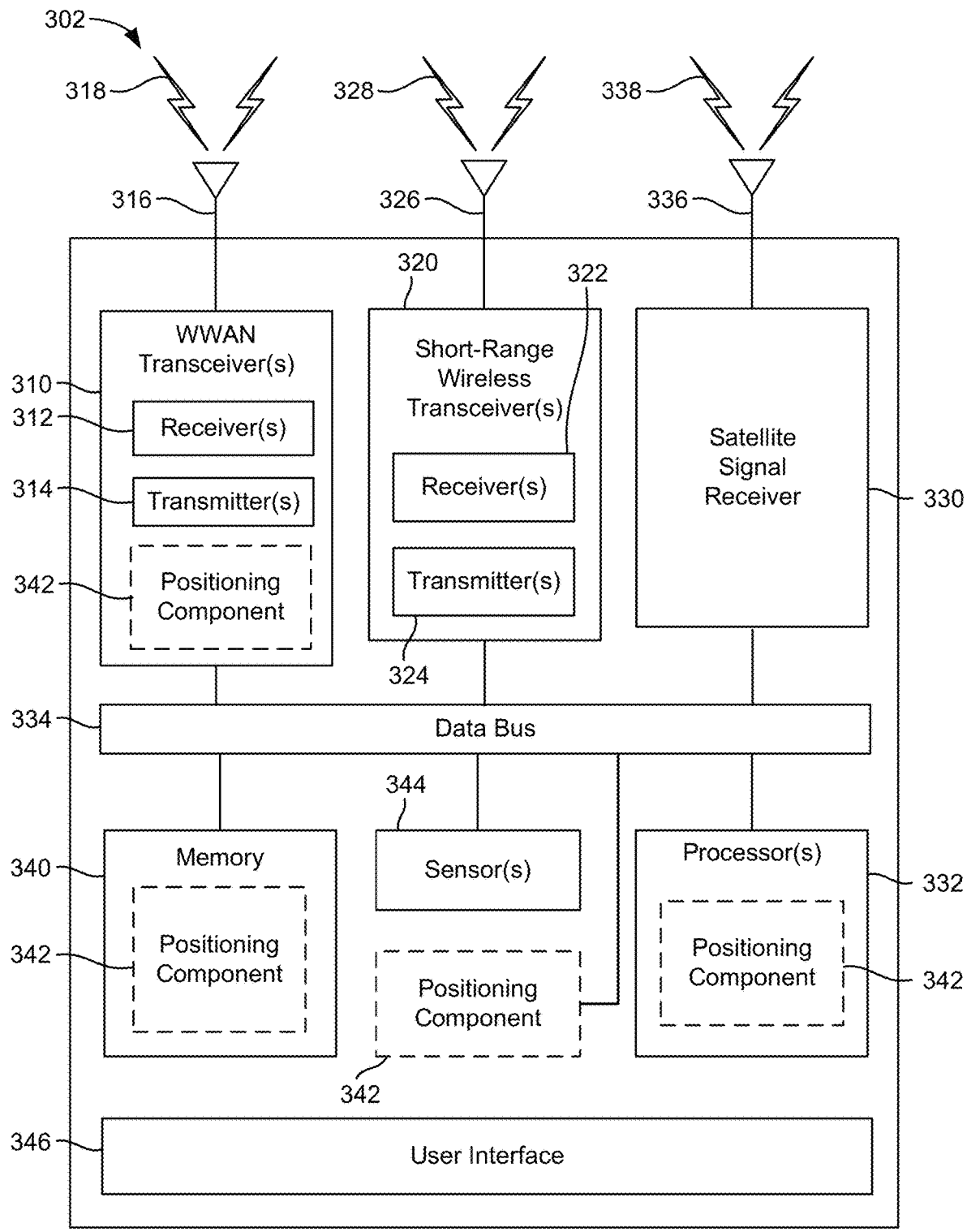
FIGS. 3A, 3B, and 3C are simplified block diagrams of several sample aspects of components that may be employed in a user equipment (UE), a base station, and a network entity, respectively, and configured to support communications as taught herein.
Figure 3B:
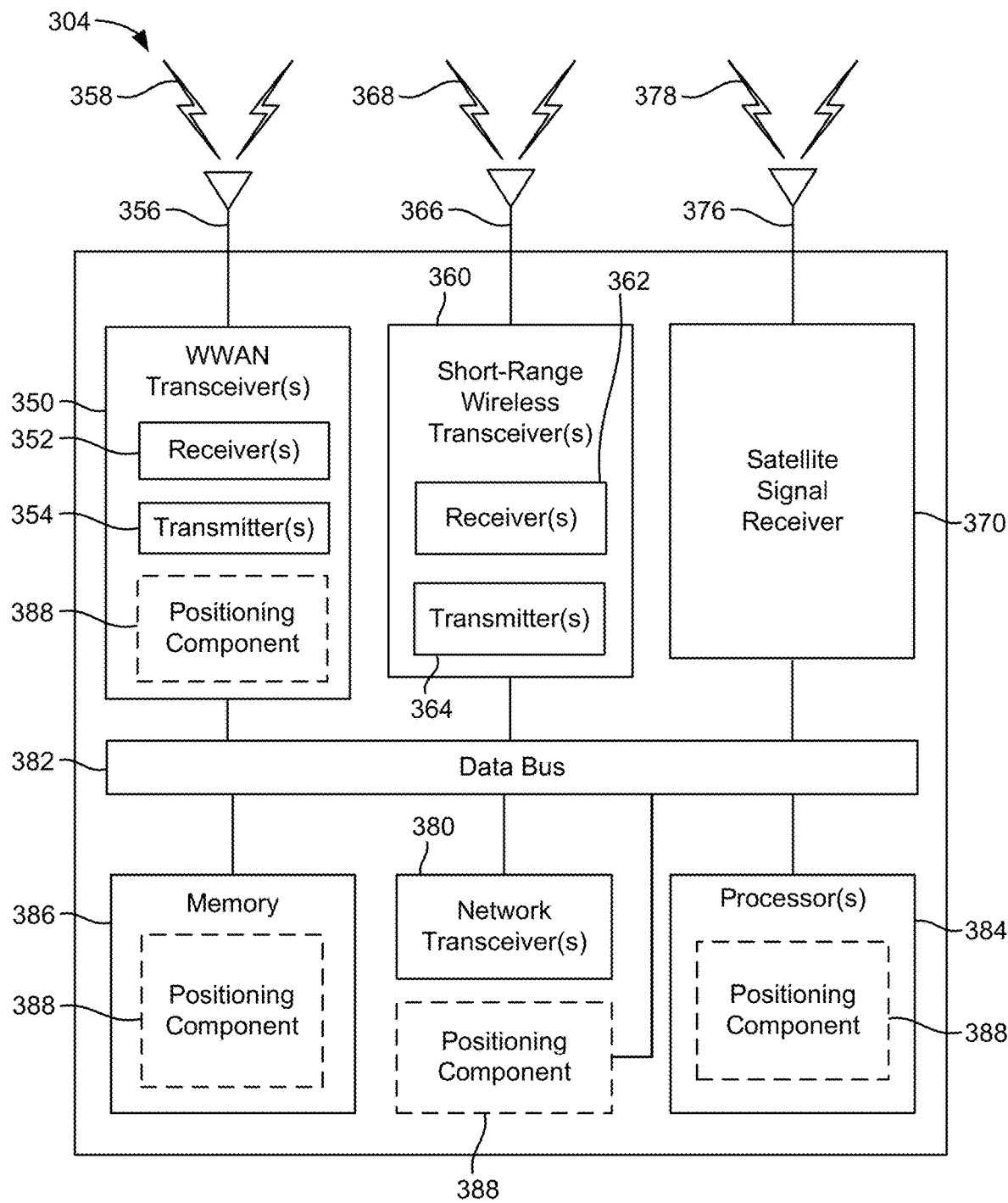
Figure 3C:
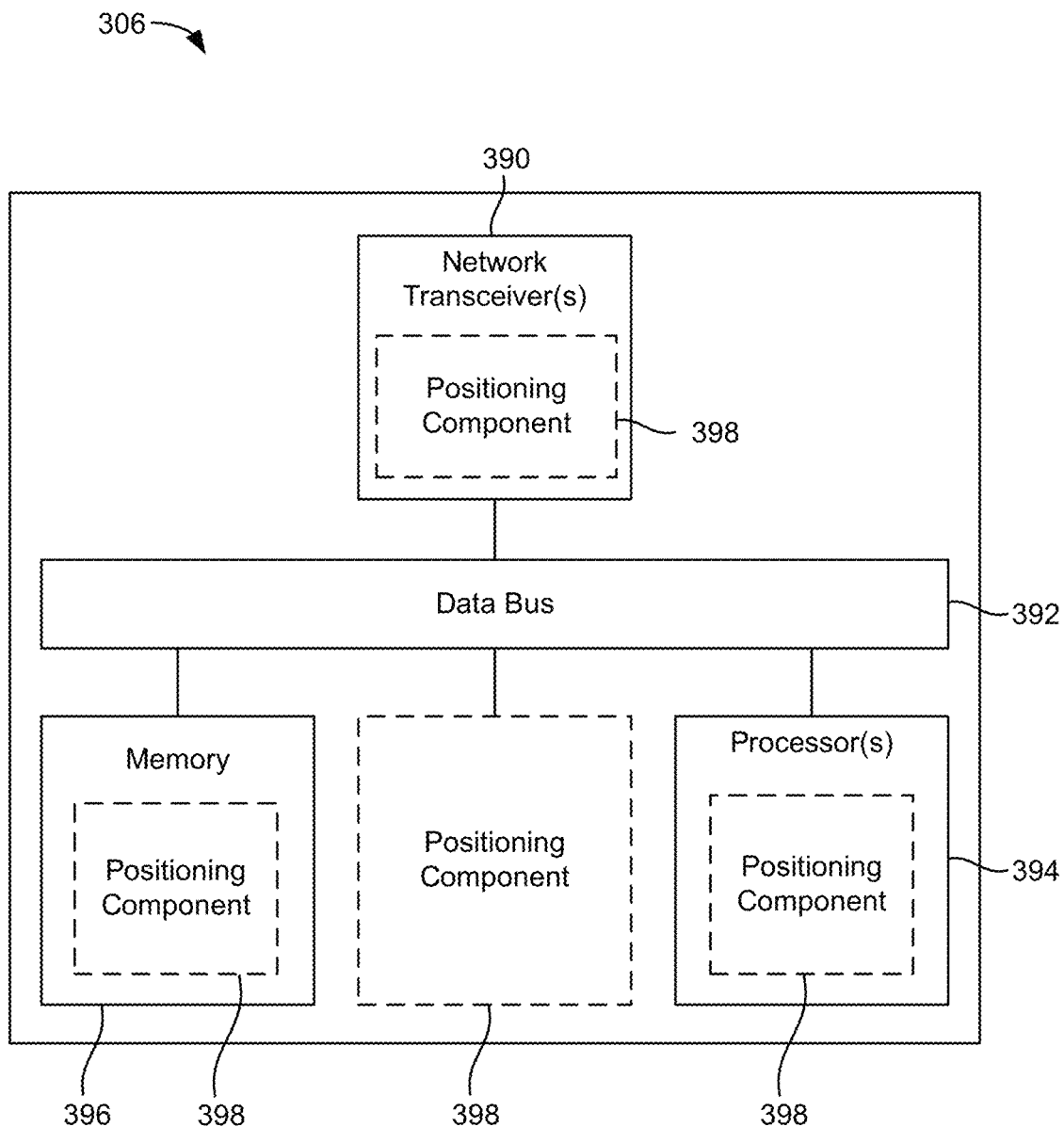

FIGS. 3A, 3B, and 3C illustrate several example components (represented by corresponding blocks) that may be incorporated into a UE 302 (which may correspond to any of the UEs described herein), a base station 304 (which may correspond to any of the base stations described herein), and a network entity 306 (which may correspond to or embody any of the network functions described herein, including the location server 230 and the LMF 270, or alternatively may be independent from the NG-RAN 220 and/or 5GC 210/260 infrastructure depicted in FIGS. 2A and 2B, such as a private network) to support the file transmission operations as taught herein. It will be appreciated that these components may be implemented in different types of apparatuses in different implementations (e.g., in an ASIC, in a system-onchip (SoC), etc.). The illustrated components may also be incorporated into other apparatuses in a communication system. For example, other apparatuses in a system may include components similar to those described to provide similar functionality. Also, a given apparatus may contain one or more of the components. For example, an apparatus may include multiple transceiver components that enable the apparatus to operate on multiple carriers and/or communicate via different technologies.

The UE 302 and the base station 304 each include one or more wireless wide area network (WWAN) transceivers 310 and 350, respectively, providing means for communicating (e.g., means for transmitting, means for receiving, means for measuring, means for tuning, means for refraining from transmitting, etc.) via one or more wireless communication networks (not shown), such as an NR network, an LTE network, a GSM network, and/or the like. The WWAN transceivers 310 and 350 may each be connected to one or more antennas 316 and 356, respectively, for communicating with other network nodes, such as other UEs, access points, base stations (e.g., eNBs, gNBs), etc., via at least one designated RAT (e.g., NR, LTE, GSM, etc.) over a wireless communication medium of interest (e.g., some set of time/frequency resources in a particular frequency spectrum). The WWAN transceivers 310 and 350 may be variously configured for transmitting and encoding signals 318 and 358 (e.g., messages, indications, information, and so on), respectively, and, conversely, for receiving and decoding signals 318 and 358 (e.g., messages, indications, information, pilots, and so on), respectively, in accordance with the designated RAT. Specifically, the WWAN transceivers 310 and 350 include one or more transmitters 314 and 354, respectively, for transmitting and encoding signals 318 and 358, respectively, and one or more receivers 312 and 352, respectively, for receiving and decoding signals 318 and 358, respectively.

The UE 302 and the base station 304 each also include, at least in some cases, one or more short-range wireless transceivers 320 and 360, respectively. The short-range wireless transceivers 320 and 360 may be connected to one or more antennas 326 and 366, respectively, and provide means for communicating (e.g., means for transmitting, means for receiving, means for measuring, means for tuning, means for refraining from transmitting, etc.) with other network nodes, such as other UEs, access points, base stations, etc., via at least one designated RAT (e.g., WiFi, LTE-D, Bluetooth®, Zigbee®, Z-Wave®, PC5, dedicated short-range communications (DSRC), wireless access for vehicular environments (WAVE), near-field communication (NFC), etc.) over a wireless communication medium of interest. The short-range wireless transceivers 320 and 360 may be variously configured for transmitting and encoding signals 328 and 368 (e.g., messages, indications, information, and so on), respectively, and, conversely, for receiving and decoding signals 328 and 368 (e.g., messages, indications, information, pilots, and so on), respectively, in accordance with the designated RAT. Specifically, the short-range wireless transceivers 320 and 360 include one or more transmitters 324 and 364, respectively, for transmitting and encoding signals 328 and 368, respectively, and one or more receivers 322 and 362, respectively, for receiving and decoding signals 328 and 368, respectively. As specific examples, the short-range wireless transceivers 320 and 360 may be WiFi transceivers, Bluetooth® transceivers, Zigbee® and/or Z-Wave® transceivers, NFC transceivers, or vehicle-to-vehicle (V2V) and/or vehicle-to-everything (V2X) transceivers.

The UE 302 and the base station 304 also include, at least in some cases, satellite signal receivers 330 and 370. The satellite signal receivers 330 and 370 may be connected to one or more antennas 336 and 376, respectively, and may provide means for receiving and/or measuring satellite positioning/communication signals 338 and 378, respectively. Where the satellite signal receivers 330 and 370 are satellite positioning system receivers, the satellite positioning/communication signals 338 and 378 may be global positioning system (GPS) signals, global navigation satellite system (GLONASS) signals, Galileo signals, Beidou signals, Indian Regional Navigation Satellite System (NAVIC), Quasi-Zenith Satellite System (QZSS), etc. Where the satellite signal receivers 330 and 370 are non-terrestrial network (NTN) receivers, the satellite positioning/communication signals 338 and 378 may be communication signals (e.g., carrying control and/or user data) originating from a 5G network. The satellite signal receivers 330 and 370 may comprise any suitable hardware and/or software for receiving and processing satellite positioning/communication signals 338 and 378, respectively. The satellite signal receivers 330 and 370 may request information and operations as appropriate from the other systems, and, at least in some cases, perform calculations to determine locations of the UE 302 and the base station 304, respectively, using measurements obtained by any suitable satellite positioning system algorithm.

The base station 304 and the network entity 306 each include one or more network transceivers 380 and 390, respectively, providing means for communicating (e.g., means for transmitting, means for receiving, etc.) with other network entities (e.g., other base stations 304, other network entities 306). For example, the base station 304 may employ the one or more network transceivers 380 to communicate with other base stations 304 or network entities 306 over one or more wired or wireless backhaul links. As another example, the network entity 306 may employ the one or more network transceivers 390 to communicate with one or more base station 304 over one or more wired or wireless backhaul links, or with other network entities 306 over one or more wired or wireless core network interfaces.

A transceiver may be configured to communicate over a wired or wireless link. A transceiver (whether a wired transceiver or a wireless transceiver) includes transmitter circuitry (e.g., transmitters 314, 324, 354, 364) and receiver circuitry (e.g., receivers 312, 322, 352, 362). A transceiver may be an integrated device (e.g., embodying transmitter circuitry and receiver circuitry in a single device) in some implementations, may comprise separate transmitter circuitry and separate receiver circuitry in some implementations, or may be embodied in other ways in other implementations. The transmitter circuitry and receiver circuitry of a wired transceiver (e.g., network transceivers 380 and 390 in some implementations) may be coupled to one or more wired network interface ports. Wireless transmitter circuitry (e.g., transmitters 314, 324, 354, 364) may include or be coupled to a plurality of antennas (e.g., antennas 316, 326, 356, 366), such as an antenna array, that permits the respective apparatus (e.g., UE 302, base station 304) to perform transmit "beamforming," as described herein. Similarly, wireless receiver circuitry (e.g., receivers 312, 322, 352, 362) may include or be coupled to a plurality of antennas (e.g., antennas 316, 326, 356, 366), such as an antenna array, that permits the respective apparatus (e.g., UE 302, base station 304) to perform receive beamforming, as described herein. In an aspect, the transmitter circuitry and receiver circuitry may share the same plurality of antennas (e.g., antennas 316, 326, 356, 366), such that the respective apparatus can only receive or transmit at a given time, not both at the same time. A wireless transceiver (e.g., WWAN transceivers 310 and 350, short-range wireless transceivers 320 and 360) may also include a network listen module (NLM) or the like for performing various measurements.

As used herein, the various wireless transceivers (e.g., transceivers 310, 320, 350, and 360, and network transceivers 380 and 390 in some implementations) and wired transceivers (e.g., network transceivers 380 and 390 in some implementations) may generally be characterized as "a transceiver," "at least one transceiver," or "one or more transceivers." As such, whether a particular transceiver is a wired or wireless transceiver may be inferred from the type of communication performed. For example, backhaul communication between network devices or servers will generally relate to signaling via a wired transceiver, whereas wireless communication between a UE (e.g., UE 302) and a base station (e.g., base station 304) will generally relate to signaling via a wireless transceiver.

The UE 302, the base station 304, and the network entity 306 also include other components that may be used in conjunction with the operations as disclosed herein. The UE 302, the base station 304, and the network entity 306 include one or more processors 332, 384, and 394, respectively, for providing functionality relating to, for example, wireless communication, and for providing other processing functionality. The processors 332, 384, and 394 may therefore provide means for processing, such as means for determining, means for calculating, means for receiving, means for transmitting, means for indicating, etc. In an aspect, the processors 332, 384, and 394 may include, for example, one or more general purpose processors, multi-core processors, central processing units (CPUs), ASICs, digital signal processors (DSPs), field programmable gate arrays (FPGAs), other programmable logic devices or processing circuitry, or various combinations thereof.

The UE 302, the base station 304, and the network entity 306 include memory circuitry implementing memories 340, 386, and 396 (e.g., each including a memory device), respectively, for maintaining information (e.g., information indicative of reserved resources, thresholds, parameters, and so on). The memories 340, 386, and 396 may therefore provide means for storing, means for retrieving, means for maintaining, etc. In some cases, the UE 302, the base station 304, and the network entity 306 may include positioning component 342, 388, and 398, respectively. The positioning component 342, 388, and 398 may be hardware circuits that are part of or coupled to the processors 332, 384, and 394, respectively, that, when executed, cause the UE 302, the base station 304, and the network entity 306 to perform the functionality described herein. In other aspects, the positioning component 342, 388, and 398 may be external to the processors 332, 384, and 394 (e.g., part of a modem processing system, integrated with another processing system, etc.). Alternatively, the positioning component 342, 388, and 398 may be memory modules stored in the memories 340, 386, and 396, respectively, that, when executed by the processors 332, 384, and 394 (or a modem processing system, another processing system, etc.), cause the UE 302, the base station 304, and the network entity 306 to perform the functionality described herein. FIG. 3A illustrates possible locations of the positioning component 342, which may be, for example, part of the one or more WWAN transceivers 310, the memory 340, the one or more processors 332, or any combination thereof, or may be a standalone component. FIG. 3B illustrates possible locations of the positioning component 388, which may be, for example, part of the one or more WWAN transceivers 350, the memory 386, the one or more processors 384, or any combination thereof, or may be a standalone component. FIG. 3C illustrates possible locations of the positioning component 398, which may be, for example, part of the one or more network transceivers 390, the memory 396, the one or more processors 394, or any combination thereof, or may be a standalone component.

The UE 302 may include one or more sensors 344 coupled to the one or more processors 332 to provide means for sensing or detecting movement and/or orientation information that is independent of motion data derived from signals received by the one or more WWAN transceivers 310, the one or more short-range wireless transceivers 320, and/or the satellite signal receiver 330. By way of example, the sensor(s) 344 may include an accelerometer (e.g., a micro-electrical mechanical systems (MEMS) device), a gyroscope, a geomagnetic sensor (e.g., a compass), an altimeter (e.g., a barometric pressure altimeter), and/or any other type of movement detection sensor. Moreover, the sensor(s) 344 may include a plurality of different types of devices and combine their outputs in order to provide motion information. For example, the sensor(s) 344 may use a combination of a multi-axis accelerometer and orientation sensors to provide the ability to compute positions in two-dimensional (2D) and/or three-dimensional (3D) coordinate systems.

In addition, the UE 302 includes a user interface 346 providing means for providing indications (e.g., audible and/or visual indications) to a user and/or for receiving user input (e.g., upon user actuation of a sensing device such a keypad, a touch screen, a microphone, and so on). Although not shown, the base station 304 and the network entity 306 may also include user interfaces.

Referring to the one or more processors 384 in more detail, in the downlink, IP packets from the network entity 306 may be provided to the processor 384. The one or more processors 384 may implement functionality for an RRC layer, a packet data convergence protocol (PDCP) layer, a radio link control (RLC) layer, and a medium access control (MAC) layer. The one or more processors 384 may provide RRC layer functionality associated with broadcasting of system information (e.g., master information block (MIB), system information blocks (SIBs)), RRC connection control (e.g., RRC connection paging, RRC connection establishment, RRC connection modification, and RRC connection release), inter-RAT mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer PDUs, error correction through automatic repeat request (ARQ), concatenation, segmentation, and reassembly of RLC service data units (SDUs), re-segmentation of RLC data PDUs, and reordering of RLC data PDUs; and MAC layer functionality associated with mapping between logical channels and transport channels, scheduling information reporting, error correction, priority handling, and logical channel prioritization.

The transmitter 354 and the receiver 352 may implement Layer-1 (L1) functionality associated with various signal processing functions. Layer-1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The transmitter 354 handles mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an orthogonal frequency division multiplexing (OFDM) subcarrier, multiplexed with a reference signal (e.g., pilot) in the time and/or frequency domain, and then combined together using an inverse fast Fourier transform (IFFT) to produce a physical channel carrying a time domain OFDM symbol stream. The OFDM symbol stream is spatially precoded to produce multiple spatial streams. Channel estimates from a channel estimator may be used to determine the coding and modulation scheme, as well as for spatial processing. The channel estimate may be derived from a reference signal and/or channel condition feedback transmitted by the UE 302. Each spatial stream may then be provided to one or more different antennas 356. The transmitter 354 may modulate an RF carrier with a respective spatial stream for transmission.

At the UE 302, the receiver 312 receives a signal through its respective antenna(s) 316. The receiver 312 recovers information modulated onto an RF carrier and provides the information to the one or more processors 332. The transmitter 314 and the receiver 312 implement Layer-1 functionality associated with various signal processing functions. The receiver 312 may perform spatial processing on the information to recover any spatial streams destined for the UE 302. If multiple spatial streams are destined for the UE 302, they may be combined by the receiver 312 into a single OFDM symbol stream. The receiver 312 then converts the OFDM symbol stream from the time-domain to the frequency domain using a fast Fourier transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the base station 304. These soft decisions may be based on channel estimates computed by a channel estimator. The soft decisions are then decoded and de-interleaved to recover the data and control signals that were originally transmitted by the base station 304 on the physical channel. The data and control signals are then provided to the one or more processors 332, which implements Layer-3 (L3) and Layer-2 (L2) functionality.

In the uplink, the one or more processors 332 provides demultiplexing between transport and logical channels, packet reassembly, deciphering, header decompression, and control signal processing to recover IP packets from the core network. The one or more processors 332 are also responsible for error detection.

Similar to the functionality described in connection with the downlink transmission by the base station 304, the one or more processors 332 provides RRC layer functionality associated with system information (e.g., MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through hybrid automatic repeat request (HARQ), priority handling, and logical channel prioritization.

Channel estimates derived by the channel estimator from a reference signal or feedback transmitted by the base station 304 may be used by the transmitter 314 to select the appropriate coding and modulation schemes, and to facilitate spatial processing. The spatial streams generated by the transmitter 314 may be provided to different antenna(s) 316. The transmitter 314 may modulate an RF carrier with a respective spatial stream for transmission.

The uplink transmission is processed at the base station 304 in a manner similar to that described in connection with the receiver function at the UE 302. The receiver 352 receives a signal through its respective antenna(s) 356. The receiver 352 recovers information modulated onto an RF carrier and provides the information to the one or more processors 384.

In the uplink, the one or more processors 384 provides demultiplexing between transport and logical channels, packet reassembly, deciphering, header decompression, control signal processing to recover IP packets from the UE 302. IP packets from the one or more processors 384 may be provided to the core network. The one or more processors 384 are also responsible for error detection.

For convenience, the UE 302, the base station 304, and/or the network entity 306 are shown in FIGS. 3A, 3B, and 3C as including various components that may be configured according to the various examples described herein. It will be appreciated, however, that the illustrated components may have different functionality in different designs. In particular, various components in FIGS. 3A to 3C are optional in alternative configurations and the various aspects include configurations that may vary due to design choice, costs, use of the device, or other considerations. For example, in case of FIG. 3A, a particular implementation of UE 302 may omit the WWAN transceiver(s) 310 (e.g., a wearable device or tablet computer or PC or laptop may have Wi-Fi and/or Bluetooth capability without cellular capability), or may omit the short-range wireless transceiver(s) 320 (e.g., cellular-only, etc.), or may omit the satellite signal receiver 330, or may omit the sensor(s) 344, and so on. In another example, in case of FIG. 3B, a particular implementation of the base station 304 may omit the WWAN transceiver(s) 350 (e.g., a Wi-Fi "hotspot" access point without cellular capability), or may omit the short-range wireless transceiver(s) 360 (e.g., cellular-only, etc.), or may omit the satellite receiver 370, and so on. For brevity, illustration of the various alternative configurations is not provided herein, but would be readily understandable to one skilled in the art.

The various components of the UE 302, the base station 304, and the network entity 306 may be communicatively coupled to each other over data buses 334, 382, and 392, respectively. In an aspect, the data buses 334, 382, and 392 may form, or be part of, a communication interface of the UE 302, the base station 304, and the network entity 306, respectively. For example, where different logical entities are embodied in the same device (e.g., gNB and location server functionality incorporated into the same base station 304), the data buses 334, 382, and 392 may provide communication between them.

The components of FIGS. 3A, 3B, and 3C may be implemented in various ways. In some implementations, the components of FIGS. 3A, 3B, and 3C may be implemented in one or more circuits such as, for example, one or more processors and/or one or more ASICs (which may include one or more processors). Here, each circuit may use and/or incorporate at least one memory component for storing information or executable code used by the circuit to provide this functionality. For example, some or all of the functionality represented by blocks 310 to 346 may be implemented by processor and memory component(s) of the UE 302 (e.g., by execution of appropriate code and/or by appropriate configuration of processor components). Similarly, some or all of the functionality represented by blocks 350 to 388 may be implemented by processor and memory component(s) of the base station 304 (e.g., by execution of appropriate code and/or by appropriate configuration of processor components). Also, some or all of the functionality represented by blocks 390 to 398 may be implemented by processor and memory component(s) of the network entity 306 (e.g., by execution of appropriate code and/or by appropriate configuration of processor components). For simplicity, various operations, acts, and/or functions are described herein as being performed "by a UE," "by a base station," "by a network entity," etc. However, as will be appreciated, such operations, acts, and/or functions may actually be performed by specific components or combinations of components of the UE 302, base station 304, network entity 306, etc., such as the processors 332, 384, 394, the transceivers 310, 320, 350, and 360, the memories 340, 386, and 396, the positioning component 342, 388, and 398, etc.

In some designs, the network entity 306 may be implemented as a core network component. In other designs, the network entity 306 may be distinct from a network operator or operation of the cellular network infrastructure (e.g., NG RAN 220 and/or 5GC 210/260). For example, the network entity 306 may be a component of a private network that may be configured to communicate with the UE 302 via the base station 304 or independently from the base station 304 (e.g., over a non-cellular communication link, such as WiFi).

NR supports a number of cellular network-based positioning technologies, including downlink-based, uplink-based, and downlink-and-uplink-based positioning methods. Downlink-based positioning methods include observed time difference of arrival (OTDOA) in LTE, downlink time difference of arrival (DL-TDOA) in NR, and downlink angle-of-departure (DL-AoD) in NR. In an OTDOA or DL-TDOA positioning procedure, a UE measures the differences between the times of arrival (ToAs) of reference signals (e.g., positioning reference signals (PRS)) received from pairs of base stations, referred to as reference signal time difference (RSTD) or time difference of arrival (TDOA) measurements, and reports them to a positioning entity. More specifically, the UE receives the identifiers (IDs) of a reference base station (e.g., a serving base station) and multiple non-reference base stations in assistance data. The UE then measures the RSTD between the reference base station and each of the non-reference base stations. Based on the known locations of the involved base stations and the RSTD measurements, the positioning entity (e.g., the UE for UE-based positioning or a location server for UE-assisted positioning) can estimate the UE's location.

For DL-AoD positioning, the positioning entity uses a beam report from the UE of received signal strength measurements of multiple downlink transmit beams to determine the angle(s) between the UE and the transmitting base station(s). The positioning entity can then estimate the location of the UE based on the determined angle(s) and the known location(s) of the transmitting base station(s).

Uplink-based positioning methods include uplink time difference of arrival (UL-TDOA) and uplink angle-of-arrival (UL-AoA). UL-TDOA is similar to DL-TDOA, but is based on uplink reference signals (e.g., sounding reference signals (SRS)) transmitted by the UE. For UL-AoA positioning, one or more base stations measure the received signal strength of one or more uplink reference signals (e.g., SRS) received from a UE on one or more uplink receive beams. The positioning entity uses the signal strength measurements and the angle(s) of the receive beam(s) to determine the angle(s) between the UE and the base station(s). Based on the determined angle(s) and the known location(s) of the base station(s), the positioning entity can then estimate the location of the UE.

Downlink-and-uplink-based positioning methods include enhanced cell-ID (E-CID) positioning and multi-round-trip-time (RTT) positioning (also referred to as "multi-cell RTT" and "multi-RTT"). In an RTT procedure, a first entity (e.g., a base station or a UE) transmits a first RTT-related signal (e.g., a PRS or SRS) to a second entity (e.g., a UE or base station), which transmits a second RTT-related signal (e.g., an SRS or PRS) back to the first entity. Each entity measures the time difference between the time of arrival (ToA) of the received RTT-related signal and the transmission time of the transmitted RTT-related signal. This time difference is referred to as a reception-to-transmission (Rx-Tx) time difference. The Rx-Tx time difference measurement may be made, or may be adjusted, to include only a time difference between nearest subframe boundaries for the received and transmitted signals. Both entities may then send their Rx-Tx time difference measurement to a location server (e.g., an LMF 270), which calculates the round trip propagation time (i.e., RTT) between the two entities from the two Rx-Tx time difference measurements (e.g., as the sum of the two Rx-Tx time difference measurements). Alternatively, one entity may send its Rx-Tx time difference measurement to the other entity, which then calculates the RTT. The distance between the two entities can be determined from the RTT and the known signal speed (e.g., the speed of light). For multi-RTT positioning, a first entity (e.g., a UE or base station) performs an RTT positioning procedure with multiple second entities (e.g., multiple base stations or UEs) to enable the location of the first entity to be determined (e.g., using multilateration) based on distances to, and the known locations of, the second entities. RTT and multi-RTT methods can be combined with other positioning techniques, such as UL-AoA and DL-AoD, to improve location accuracy.

The E-CID positioning method is based on radio resource management (RRM) measurements. In E-CID, the UE reports the serving cell ID, the timing advance (TA), and the identifiers, estimated timing, and signal strength of detected neighbor base stations. The location of the UE is then estimated based on this information and the known locations of the base station(s).

To assist positioning operations, a location server (e.g., location server 230, LMF 270, SLP 272) may provide assistance data to the UE. For example, the assistance data may include identifiers of the base stations (or the cells/TRPs of the base stations) from which to measure reference signals, the reference signal configuration parameters (e.g., the number of consecutive positioning subframes, periodicity of positioning subframes, muting sequence, frequency hopping sequence, reference signal identifier, reference signal bandwidth, etc.), and/or other parameters applicable to the particular positioning method. Alternatively, the assistance data may originate directly from the base stations themselves (e.g., in periodically broadcasted overhead messages, etc.). In some cases, the UE may be able to detect neighbor network nodes itself without the use of assistance data.

In the case of an OTDOA or DL-TDOA positioning procedure, the assistance data may further include an expected RSTD value and an associated uncertainty, or search window, around the expected RSTD. In some cases, the value range of the expected RSTD may be +/−500 microseconds (µs). In some cases, when any of the resources used for the positioning measurement are in FR1, the value range for the uncertainty of the expected RSTD may be +/−32 µs. In other cases, when all of the resources used for the positioning measurement(s) are in FR2, the value range for the uncertainty of the expected RSTD may be +/−8 µs.

A location estimate may be referred to by other names, such as a position estimate, location, position, position fix, fix, or the like. A location estimate may be geodetic and comprise coordinates (e.g., latitude, longitude, and possibly altitude) or may be civic and comprise a street address, postal address, or some other verbal description of a location. A location estimate may further be defined relative to some other known location or defined in absolute terms (e.g., using latitude, longitude, and possibly altitude). A location estimate may include an expected error or uncertainty (e.g., by including an area or volume within which the location is expected to be included with some specified or default level of confidence).

Figure 4A:
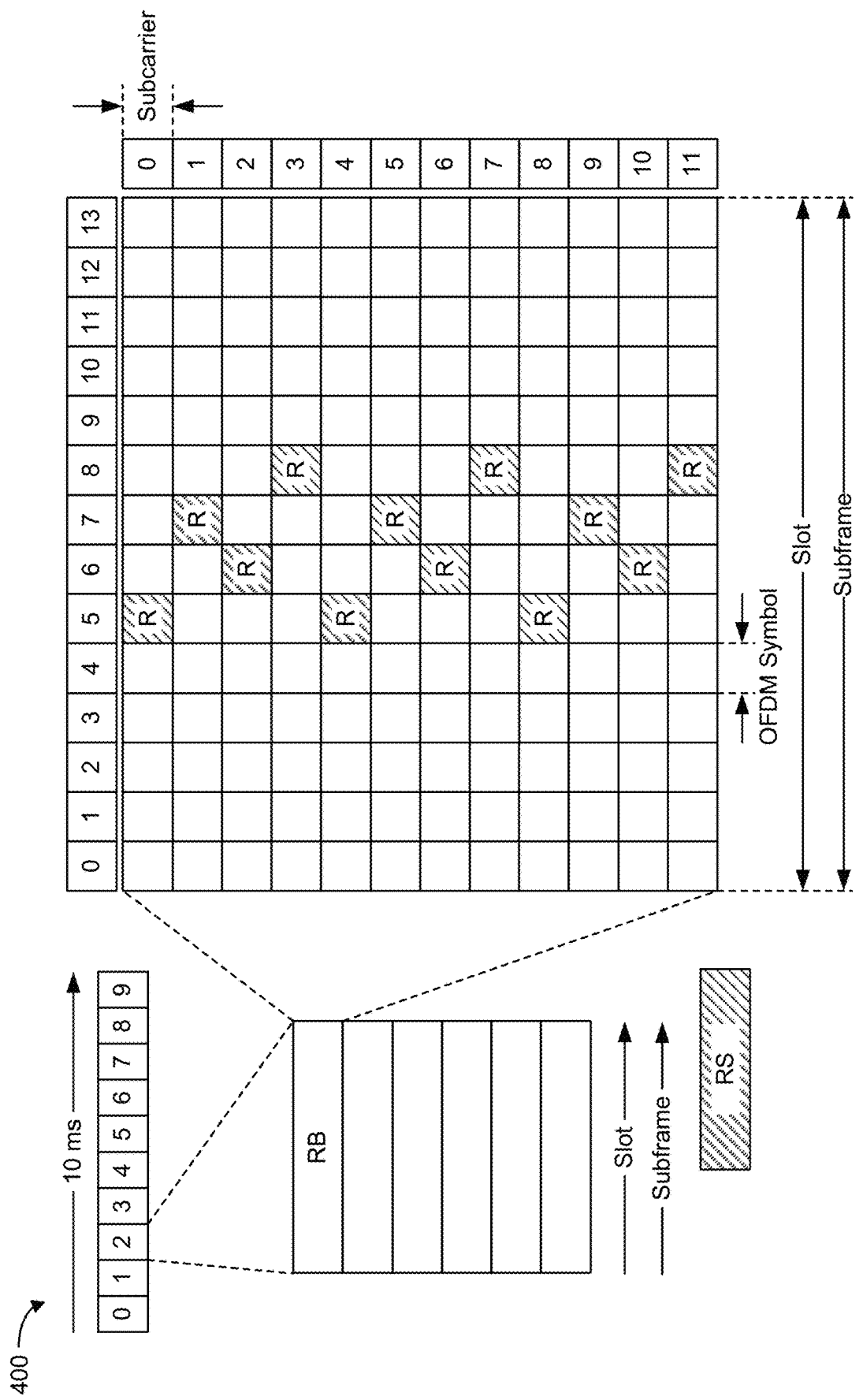
FIG. 4A is a diagram illustrating an example frame structure, according to aspects of the disclosure.

Various frame structures may be used to support downlink and uplink transmissions between network nodes (e.g., base stations and UEs). FIG. 4A is a diagram 400 illustrating an example frame structure, according to aspects of the disclosure. The frame structure may be a downlink or uplink frame structure. Other wireless communications technologies may have different frame structures and/or different channels.

LTE, and in some cases NR, utilizes OFDM on the downlink and single-carrier frequency division multiplexing (SC-FDM) on the uplink. Unlike LTE, however, NR has an option to use OFDM on the uplink as well. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kilohertz (kHz) and the minimum resource allocation (resource block) may be 12 subcarriers (or 180 kHz). Consequently, the nominal FFT size may be equal to 128, 256, 512, 1024, or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10, or 20 MHz, respectively.

LTE supports a single numerology (subcarrier spacing (SCS), symbol length, etc.). In contrast, NR may support multiple numerologies (µ), for example, subcarrier spacings of 15 kHz (µ=0), 30 kHz (µ=1), 60 kHz (µ=2), 120 kHz (µ=3), and 240 kHz (µ=4) or greater may be available. In each subcarrier spacing, there are 14 symbols per slot. For 15 kHz SCS (µ=0), there is one slot per subframe, 10 slots per frame, the slot duration is 1 millisecond (ms), the symbol duration is 66.7 microseconds (µs), and the maximum nominal system bandwidth (in MHz) with a 4K FFT size is 50. For 30 kHz SCS (µ=1), there are two slots per subframe, 20 slots per frame, the slot duration is 0.5 ms, the symbol duration is 33.3 µs, and the maximum nominal system bandwidth (in MHz) with a 4K FFT size is 100. For 60 kHz SCS (µ=2), there are four slots per subframe, 40 slots per frame, the slot duration is 0.25 ms, the symbol duration is 16.7 µs, and the maximum nominal system bandwidth (in MHz) with a 4K FFT size is 200. For 120 kHz SCS (µ=3), there are eight slots per subframe, 80 slots per frame, the slot duration is 0.125 ms, the symbol duration is 8.33 µs, and the maximum nominal system bandwidth (in MHz) with a 4K FFT size is 400. For 240 kHz SCS (µ=4), there are 16 slots per subframe, 160 slots per frame, the slot duration is 0.0625 ms, the symbol duration is 4.17 µs, and the maximum nominal system bandwidth (in MHz) with a 4K FFT size is 800.

In the example of FIG. 4A, a numerology of 15 kHz is used. Thus, in the time domain, a 10 ms frame is divided into 10 equally sized subframes of 1 ms each, and each subframe includes one time slot. In FIG. 4A, time is represented horizontally (on the X axis) with time increasing from left to right, while frequency is represented vertically (on the Y axis) with frequency increasing (or decreasing) from bottom to top.

A resource grid may be used to represent time slots, each time slot including one or more time-concurrent resource blocks (RBs) (also referred to as physical RBs (PRBs)) in the frequency domain. The resource grid is further divided into multiple resource elements (REs). An RE may correspond to one symbol length in the time domain and one subcarrier in the frequency domain. In the numerology of FIG. 4A, for a normal cyclic prefix, an RB may contain 12 consecutive subcarriers in the frequency domain and seven consecutive symbols in the time domain, for a total of 84 REs. For an extended cyclic prefix, an RB may contain 12 consecutive subcarriers in the frequency domain and six consecutive symbols in the time domain, for a total of 72 REs. The number of bits carried by each RE depends on the modulation scheme.

Some of the REs may carry reference (pilot) signals (RS). The reference signals may include positioning reference signals (PRS), tracking reference signals (TRS), phase tracking reference signals (PTRS), cell-specific reference signals (CRS), channel state information reference signals (CSI-RS), demodulation reference signals (DMRS), primary synchronization signals (PSS), secondary synchronization signals (SSS), synchronization signal blocks (SSBs), sounding reference signals (SRS), etc., depending on whether the illustrated frame structure is used for uplink or downlink communication. FIG. 4A illustrates example locations of REs carrying a reference signal (labeled "R").

A collection of resource elements (REs) that are used for transmission of PRS is referred to as a "PRS resource." The collection of resource elements can span multiple PRBs in the frequency domain and 'N' (such as 1 or more) consecutive symbol(s) within a slot in the time domain. In a given OFDM symbol in the time domain, a PRS resource occupies consecutive PRBs in the frequency domain.

The transmission of a PRS resource within a given PRB has a particular comb size (also referred to as the "comb density"). A comb size 'N' represents the subcarrier spacing (or frequency/tone spacing) within each symbol of a PRS resource configuration.

Specifically, for a comb size 'N,' PRS are transmitted in every Nth subcarrier of a symbol of a PRB. For example, for comb-4, for each symbol of the PRS resource configuration, REs corresponding to every fourth subcarrier (such as subcarriers 0, 4, 8) are used to transmit PRS of the PRS resource. Currently, comb sizes of comb-2, comb-4, comb-6, and comb-12 are supported for DL-PRS. FIG. 4A illustrates an example PRS resource configuration for comb-4 (which spans four symbols). That is, the locations of the shaded REs (labeled "R") indicate a comb-4 PRS resource configuration.

Currently, a DL-PRS resource may span 2, 4, 6, or 12 consecutive symbols within a slot with a fully frequency-domain staggered pattern. A DL-PRS resource can be configured in any higher layer configured downlink or flexible (FL) symbol of a slot. There may be a constant energy per resource element (EPRE) for all REs of a given DL-PRS resource. The following are the frequency offsets from symbol to symbol for comb sizes 2, 4, 6, and 12 over 2, 4, 6, and 12 symbols. 2-symbol comb-2: {0, 1}; 4-symbol comb-2: {0, 1, 0, 1}; 6-symbol comb-2: {0, 1, 0, 1, 0, 1}; 12-symbol comb-2: {0, 1, 0, 1, 0, 1, 0, 1, 0, 1, 0, 1}; 4-symbol comb-4: {0, 2, 1, 3} (as in the example of FIG. 4A); 12-symbol comb-4: {0, 2, 1, 3, 0, 2, 1, 3, 0, 2, 1, 3}; 6-symbol comb-6: {0, 3, 1, 4, 2, 5}; 12-symbol comb-6: {0, 3, 1, 4, 2, 5, 0, 3, 1, 4, 2, 5}; and 12-symbol comb-12: {0, 6, 3, 9, 1, 7, 4, 10, 2, 8, 5, 11}.

A "PRS resource set" is a set of PRS resources used for the transmission of PRS signals, where each PRS resource has a PRS resource ID. In addition, the PRS resources in a PRS resource set are associated with the same TRP. A PRS resource set is identified by a PRS resource set ID and is associated with a particular TRP (identified by a TRP ID). In addition, the PRS resources in a PRS resource set have the same periodicity, a common muting pattern configuration, and the same repetition factor (such as "PRS-ResourceRepetitionFactor") across slots. The periodicity is the time from the first repetition of the first PRS resource of a first PRS instance to the same first repetition of the same first PRS resource of the next PRS instance. The periodicity may have a length selected from $2^\mu*\{4, 5, 8, 10, 16, 20, 32, 40, 64, 80, 160, 320, 640, 1280, 2560, 5120, 10240\}$ slots, with $\mu=0, 1, 2, 3$. The repetition factor may have a length selected from {1, 2, 4, 6, 8, 16, 32} slots.

A PRS resource ID in a PRS resource set is associated with a single beam (or beam ID) transmitted from a single TRP (where a TRP may transmit one or more beams). That is, each PRS resource of a PRS resource set may be transmitted on a different beam, and as such, a "PRS resource," or simply "resource," also can be referred to as a "beam." Note that this does not have any implications on whether the TRPs and the beams on which PRS are transmitted are known to the UE.

A "PRS instance" or "PRS occasion" is one instance of a periodically repeated time window (such as a group of one or more consecutive slots) where PRS are expected to be transmitted. A PRS occasion also may be referred to as a "PRS positioning occasion," a "PRS positioning instance, a "positioning occasion," "a positioning instance," a "positioning repetition," or simply an "occasion," an "instance," or a "repetition."

A "positioning frequency layer" (also referred to simply as a "frequency layer") is a collection of one or more PRS resource sets across one or more TRPs that have the same values for certain parameters. Specifically, the collection of PRS resource sets has the same subcarrier spacing and cyclic prefix (CP) type (meaning all numerologies supported for the physical downlink shared channel (PDSCH) are also supported for PRS), the same Point A, the same value of the downlink PRS bandwidth, the same start PRB (and center frequency), and the same comb-size. The Point A parameter takes the value of the parameter "ARFCN-ValueNR" (where "ARFCN" stands for "absolute radio-frequency channel number") and is an identifier/code that specifies a pair of physical radio channel used for transmission and reception. The downlink PRS bandwidth may have a granularity of four PRBs, with a minimum of 24 PRBs and a maximum of 272 PRBs. Currently, up to four frequency layers have been defined, and up to two PRS resource sets may be configured per TRP per frequency layer.

The concept of a frequency layer is somewhat like the concept of component carriers and bandwidth parts (BWPs), but different in that component carriers and BWPs are used by one base station (or a macro cell base station and a small cell base station) to transmit data channels, while frequency layers are used by several (usually three or more) base stations to transmit PRS. A UE may indicate the number of frequency layers it can support when it sends the network its positioning capabilities, such as during an LTE positioning protocol (LPP) session. For example, a UE may indicate whether it can support one or four positioning frequency layers.

Figure 4B:
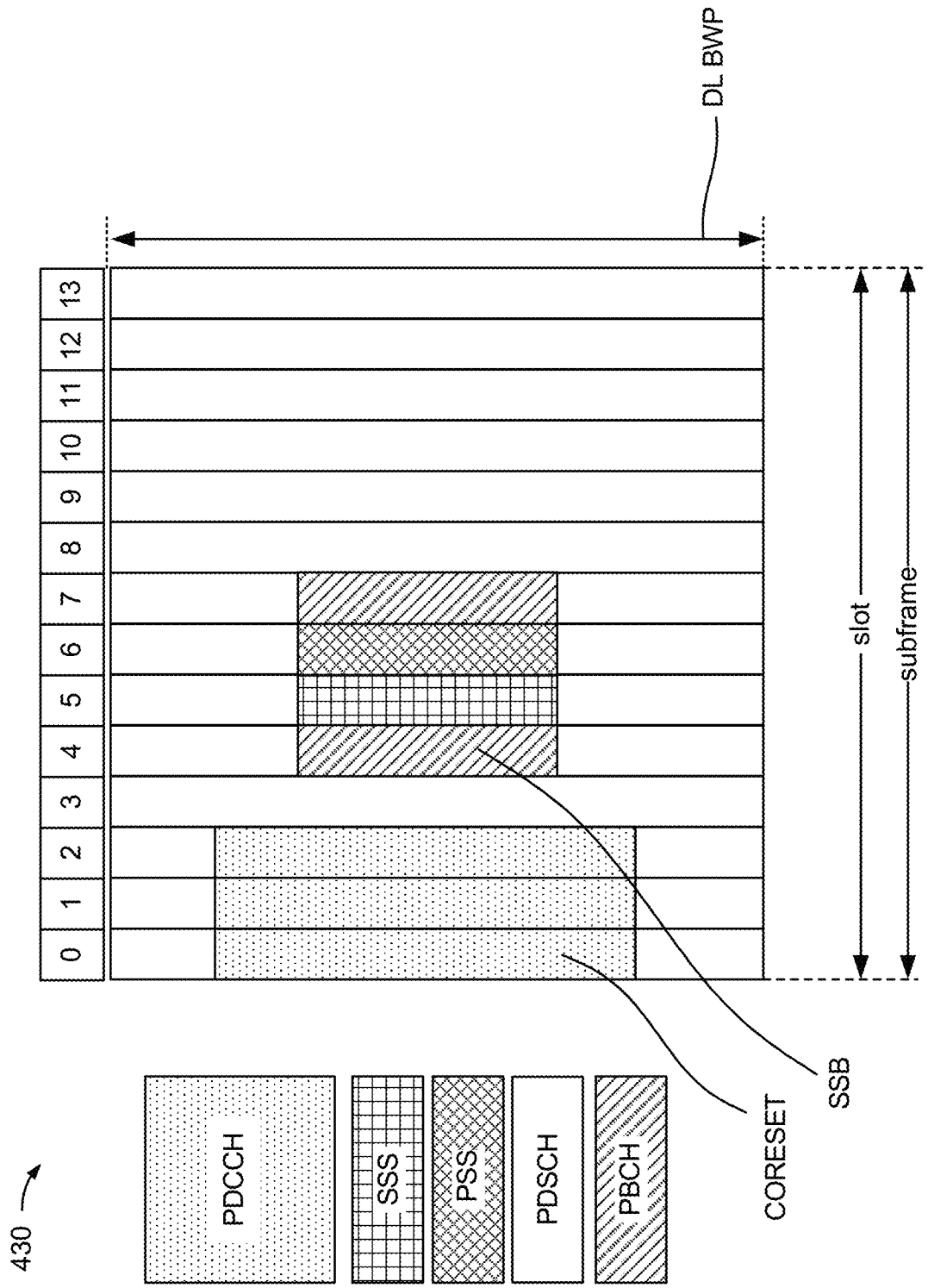
FIG. 4B is a diagram illustrating various downlink channels within an example downlink slot, according to aspects of the disclosure.

FIG. 4B is a diagram 430 illustrating various downlink channels within an example downlink slot. In FIG. 4B, time is represented horizontally (on the X axis) with time increasing from left to right, while frequency is represented vertically (on the Y axis) with frequency increasing (or decreasing) from bottom to top. In the example of FIG. 4B, a numerology of 15 kHz is used. Thus, in the time domain, the illustrated slot is one millisecond (ms) in length, divided into 14 symbols.

In NR, the channel bandwidth, or system bandwidth, is divided into multiple bandwidth parts (BWPs). A BWP is a contiguous set of RBs selected from a contiguous subset of the common RBs for a given numerology on a given carrier. Generally, a maximum of four BWPs can be specified in the downlink and uplink. That is, a UE can be configured with up to four BWPs on the downlink, and up to four BWPs on the uplink. Only one BWP (uplink or downlink) may be active at a given time, meaning the UE may only receive or transmit over one BWP at a time. On the downlink, the bandwidth of each BWP should be equal to or greater than the bandwidth of the SSB, but it may or may not contain the SSB.

Referring to FIG. 4B, a primary synchronization signal (PSS) is used by a UE to determine subframe/symbol timing and a physical layer identity. A secondary synchronization signal (SSS) is used by a UE to determine a physical layer cell identity group number and radio frame timing. Based on the physical layer identity and the physical layer cell identity group number, the UE can determine a PCI. Based on the PCI, the UE can determine the locations of the aforementioned DL-RS. The physical broadcast channel (PBCH), which carries a master information block (MIB), may be logically grouped with the PSS and SSS to form an SSB (also referred to as an SS/PBCH). The MIB provides a number of RBs in the downlink system bandwidth and a system frame number (SFN). The physical downlink shared channel (PDSCH) carries user data, broadcast system information not transmitted through the PBCH, such as system information blocks (SIBs), and paging messages.

The physical downlink control channel (PDCCH) carries downlink control information (DCI) within one or more control channel elements (CCEs), each CCE including one or more RE group (REG) bundles (which may span multiple symbols in the time domain), each REG bundle including one or more REGs, each REG corresponding to 12 resource elements (one resource block) in the frequency domain and one OFDM symbol in the time domain. The set of physical resources used to carry the PDCCH/DCI is referred to in NR as the control resource set (CORESET). In NR, a PDCCH is confined to a single CORESET and is transmitted with its own DMRS. This enables UE-specific beamforming for the PDCCH.

In the example of FIG. 4B, there is one CORESET per BWP, and the CORESET spans three symbols (although it may be only one or two symbols) in the time domain. Unlike LTE control channels, which occupy the entire system bandwidth, in NR, PDCCH channels are localized to a specific region in the frequency domain (i.e., a CORESET). Thus, the frequency component of the PDCCH shown in FIG. 4B is illustrated as less than a single BWP in the frequency domain. Note that although the illustrated CORESET is contiguous in the frequency domain, it need not be. In addition, the CORESET may span less than three symbols in the time domain.

The DCI within the PDCCH carries information about uplink resource allocation (persistent and non-persistent) and descriptions about downlink data transmitted to the UE, referred to as uplink and downlink grants, respectively. More specifically, the DCI indicates the resources scheduled for the downlink data channel (e.g., PDSCH) and the uplink data channel (e.g., physical uplink shared channel (PUSCH)). Multiple (e.g., up to eight) DCIs can be configured in the PDCCH, and these DCIs can have one of multiple formats. For example, there are different DCI formats for uplink scheduling, for downlink scheduling, for uplink transmit power control (TPC), etc. A PDCCH may be transported by 1, 2, 4, 8, or 16 CCEs in order to accommodate different DCI payload sizes or coding rates.

In an aspect, the reference signal carried on the REs labeled "R" in FIG. 4A may be SRS. SRS transmitted by a UE may be used by a base station to obtain the channel state information (CSI) for the transmitting UE. CSI describes how an RF signal propagates from the UE to the base station and represents the combined effect of scattering, fading, and power decay with distance. The system uses the SRS for resource scheduling, link adaptation, massive MIMO, beam management, etc.

A collection of REs that are used for transmission of SRS is referred to as an "SRS resource," and may be identified by the parameter "SRS-ResourceId." The collection of resource elements can span multiple PRBs in the frequency domain and 'N' (e.g., one or more) consecutive symbol(s) within a slot in the time domain. In a given OFDM symbol, an SRS resource occupies one or more consecutive PRBs. An "SRS resource set" is a set of SRS resources used for the transmission of SRS signals, and is identified by an SRS resource set ID ("SRS-ResourceSetId").

The transmission of SRS resources within a given PRB has a particular comb size (also referred to as the "comb density"). A comb size 'N' represents the subcarrier spacing (or frequency/tone spacing) within each symbol of an SRS resource configuration. Specifically, for a comb size 'N,' SRS are transmitted in every Nth subcarrier of a symbol of a PRB. For example, for comb-4, for each symbol of the SRS resource configuration, REs corresponding to every fourth subcarrier (such as subcarriers 0, 4, 8) are used to transmit SRS of the SRS resource. In the example of FIG. 4A, the illustrated SRS is comb-4 over four symbols. That is, the locations of the shaded SRS REs indicate a comb-4 SRS resource configuration.

Currently, an SRS resource may span 1, 2, 4, 8, or 12 consecutive symbols within a slot with a comb size of comb-2, comb-4, or comb-8. The following are the frequency offsets from symbol to symbol for the SRS comb patterns that are currently supported. 1-symbol comb-2: {0}; 2-symbol comb-2: {0, 1}; 2-symbol comb-4: {0, 2}; 4-symbol comb-2: {0, 1, 0, 1}; 4-symbol comb-4: {0, 2, 1, 3} (as in the example of FIG. 4A); 8-symbol comb-4: {0, 2, 1, 3, 0, 2, 1, 3}; 12-symbol comb-4: {0, 2, 1, 3, 0, 2, 1, 3, 0, 2, 1, 3}; 4-symbol comb-8: {0, 4, 2, 6}; 8-symbol comb-8: {0, 4, 2, 6, 1, 5, 3, 7}; and 12-symbol comb-8: {0, 4, 2, 6, 1, 5, 3, 7, 0, 4, 2, 6}.

Generally, as noted above, a UE transmits SRS to enable the receiving base station (either the serving base station or a neighboring base station) to measure the channel quality (i.e., CSI) between the UE and the base station. However, SRS can also be specifically configured as uplink positioning reference signals for uplink-based positioning procedures, such as uplink time difference of arrival (UL-TDOA), round-trip-time (RTT), uplink angle-of-arrival (UL-AoA), etc. As used herein, the term "SRS" may refer to SRS configured for channel quality measurements or SRS configured for positioning purposes. The former may be referred to herein as "SRS-for-communication" and/or the latter may be referred to as "SRS-for-positioning" or "positioning SRS" when needed to distinguish the two types of SRS.

Several enhancements over the previous definition of SRS have been proposed for SRS-for-positioning (also referred to as "UL-PRS"), such as a new staggered pattern within an SRS resource (except for single-symbol/comb-2), a new comb type for SRS, new sequences for SRS, a higher number of SRS resource sets per component carrier, and a higher number of SRS resources per component carrier. In addition, the parameters "SpatialRelationInfo" and "PathLossReference" are to be configured based on a downlink reference signal or SSB from a neighboring TRP. Further still, one SRS resource may be transmitted outside the active BWP, and one SRS resource may span across multiple component carriers. Also, SRS may be configured in RRC connected state and only transmitted within an active BWP. Further, there may be no frequency hopping, no repetition factor, a single antenna port, and new lengths for SRS (e.g., 8 and 12 symbols). There also may be open-loop power control and not closed-loop power control, and comb-8 (i.e., an SRS transmitted every eighth subcarrier in the same symbol) may be used. Lastly, the UE may transmit through the same transmit beam from multiple SRS resources for UL-AoA. All of these are features that are additional to the current SRS framework, which is configured through RRC higher layer signaling (and potentially triggered or activated through a MAC control element (MAC-CE) or DCI).

Note that the terms "positioning reference signal" and "PRS" generally refer to specific reference signals that are used for positioning in NR and LTE systems. However, as used herein, the terms "positioning reference signal" and "PRS" may also refer to any type of reference signal that can be used for positioning, such as but not limited to, PRS as defined in LTE and NR, TRS, PTRS, CRS, CSI-RS, DMRS, PSS, SSS, SSB, SRS, UL-PRS, etc. In addition, the terms "positioning reference signal" and "PRS" may refer to downlink or uplink positioning reference signals, unless otherwise indicated by the context. If needed to further distinguish the type of PRS, a downlink positioning reference signal may be referred to as a "DL-PRS," and an uplink positioning reference signal (e.g., an SRS-for-positioning, PTRS) may be referred to as an "UL-PRS." In addition, for signals that may be transmitted in both the uplink and downlink (e.g., DMRS, PTRS), the signals may be prepended with "UL" or "DL" to distinguish the direction. For example, "UL-DMRS" may be differentiated from "DL-DMRS."

Figure 4C:
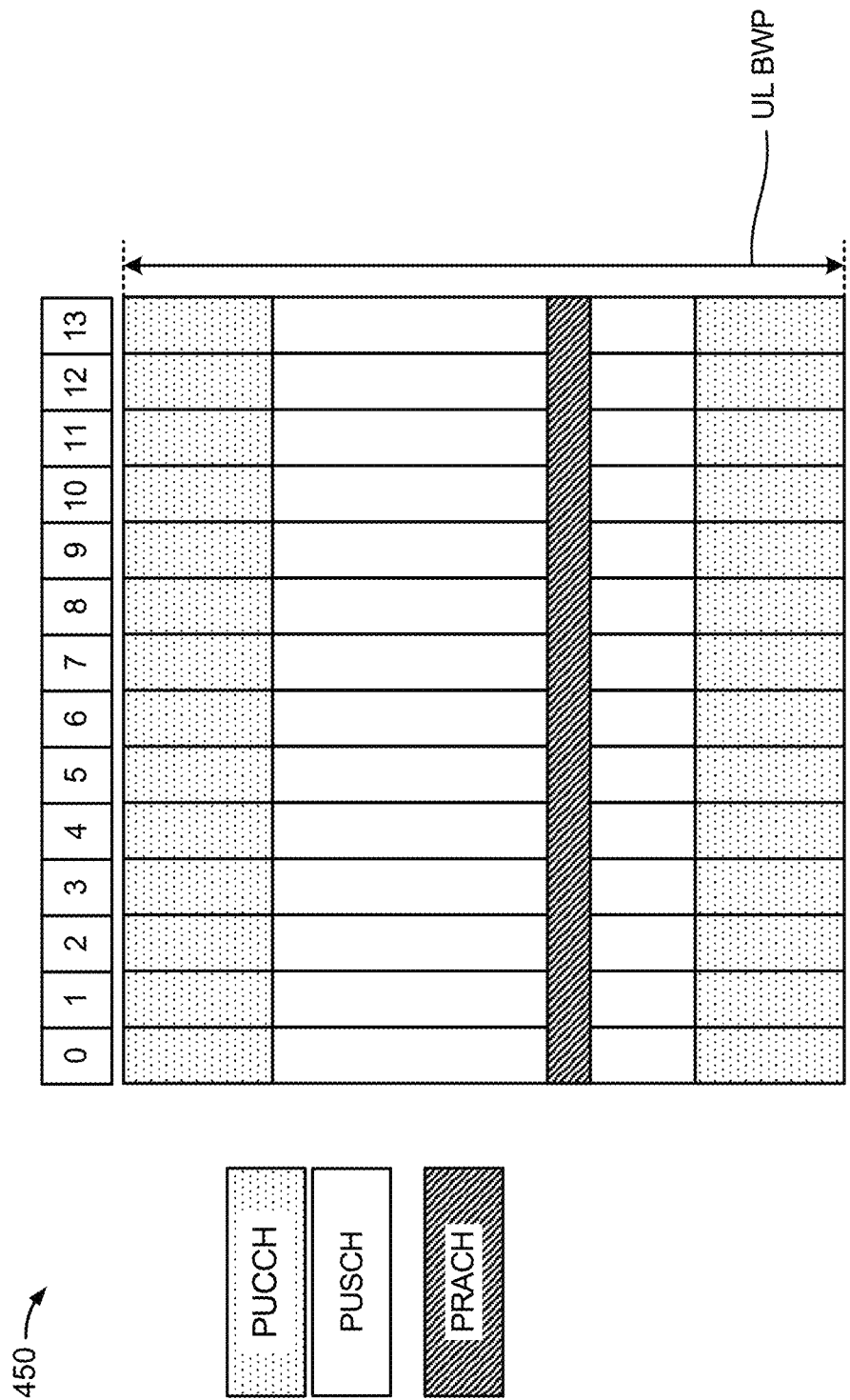
FIG. 4C is a diagram illustrating various uplink channels within an example uplink slot, according to aspects of the disclosure.

FIG. 4C is a diagram 450 illustrating various uplink channels within an example uplink slot. In FIG. 4C, time is represented horizontally (on the X axis) with time increasing from left to right, while frequency is represented vertically (on the Y axis) with frequency increasing (or decreasing) from bottom to top. In the example of FIG. 4C, a numerology of 15 kHz is used. Thus, in the time domain, the illustrated slot is one millisecond (ms) in length, divided into 14 symbols.

A random-access channel (RACH), also referred to as a physical random-access channel (PRACH), may be within one or more slots within a frame based on the PRACH configuration. The PRACH may include six consecutive RB pairs within a slot. The PRACH allows the UE to perform initial system access and achieve uplink synchronization. A physical uplink control channel (PUCCH) may be located on edges of the uplink system bandwidth. The PUCCH carries uplink control information (UCI), such as scheduling requests, CSI reports, a channel quality indicator (CQI), a precoding matrix indicator (PMI), a rank indicator (RI), and HARQ ACK/NACK feedback. The physical uplink shared channel (PUSCH) carries data, and may additionally be used to carry a buffer status report (BSR), a power headroom report (PHR), and/or UCI.

Even when there is no traffic being transmitted from the network to a UE, the UE is expected to monitor every downlink subframe on the physical downlink control channel (PDCCH). This means that the UE has to be "on," or active, all the time, even when there is no traffic, since the UE does not know exactly when the network will transmit data for it. However, being active all the time is a significant power drain for a UE.

To address this issue, a UE may implement discontinuous reception (DRX) and/or connected-mode discontinuous reception (CDRX) techniques. DRX and CDRX are mechanisms in which a UE goes into a "sleep" mode for a scheduled periods of time and "wakes up" for other periods of time. During the wake, or active, periods, the UE checks to see if there is any data coming from the network, and if there is not, goes back into sleep mode.

To implement DRX and CDRX, the UE and the network need to be synchronized. In a worst-case scenario, the network may attempt to send some data to the UE while the UE is in sleep mode, and the UE may wake up when there is no data to be received. To prevent such scenarios, the UE and the network should have a well-defined agreement about when the UE can be in sleep mode and when the UE should be awake/active. This agreement has been standardized in various technical specifications. Note that DRX includes CDRX, and thus, references to DRX refer to both DRX and CDRX, unless otherwise indicated.

The network (e.g., serving cell) can configure the UE with the DRX/CDRX timing using an RRC Connection Reconfiguration message (for CDRX) or an RRC Connection Setup message (for DRX). The network can signal the following DRX configuration parameters to the UE. (1) DRX Cycle: The duration of one 'ON time' plus one 'OFF time.' This value is not explicitly specified in RRC messages; rather, it is calculated by the subframe/slot time and "long DRX cycle start offset." (2) ON Duration Timer: The duration of 'ON time' within one DRX cycle, indicated by the parameter "drx-onDurationTimer." (3) DRX Inactivity Timer: How long a UE should remain 'ON' after the reception of a PDCCH. When this timer is on, the UE remains in the 'ON state,' which may extend the ON period into the period that would be the 'OFF' period otherwise. (4) DRX Retransmission Timer: The maximum number of consecutive PDCCH subframes/slots a UE should remain active to wait for an incoming retransmission after the first available retransmission time. (5) Short DRX Cycle: A DRX cycle that can be implemented within the 'OFF' period of a long DRX cycle. (6) DRX Short Cycle Timer: The consecutive number of subframes/slots that should follow the short DRX cycle after the DRX inactivity timer has expired.

Figure 5A:
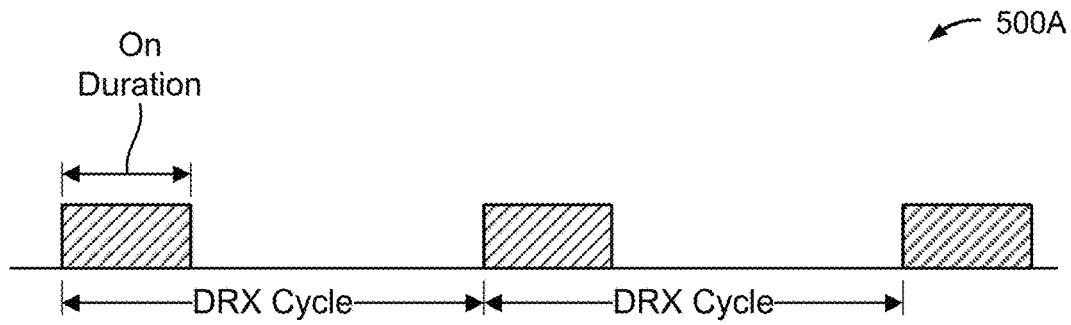
FIGS. 5A to 5C illustrate example discontinuous reception (DRX) configurations, according to aspects of the disclosure.
Figure 5B:
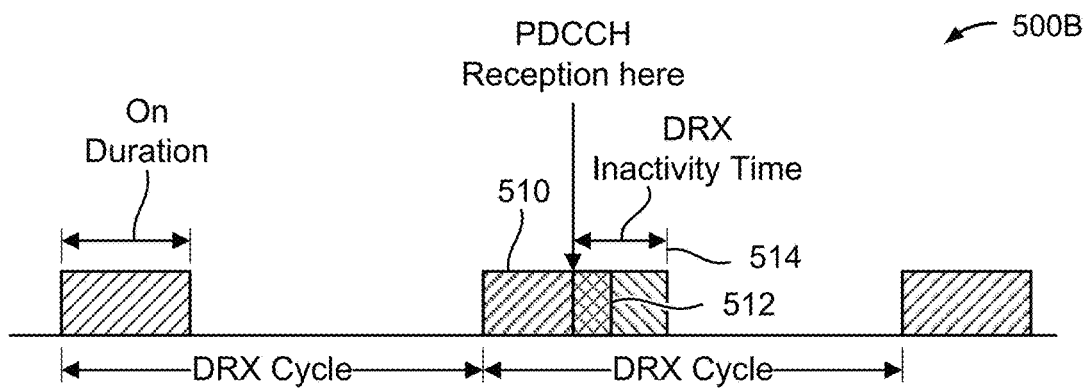
Figure 5C:
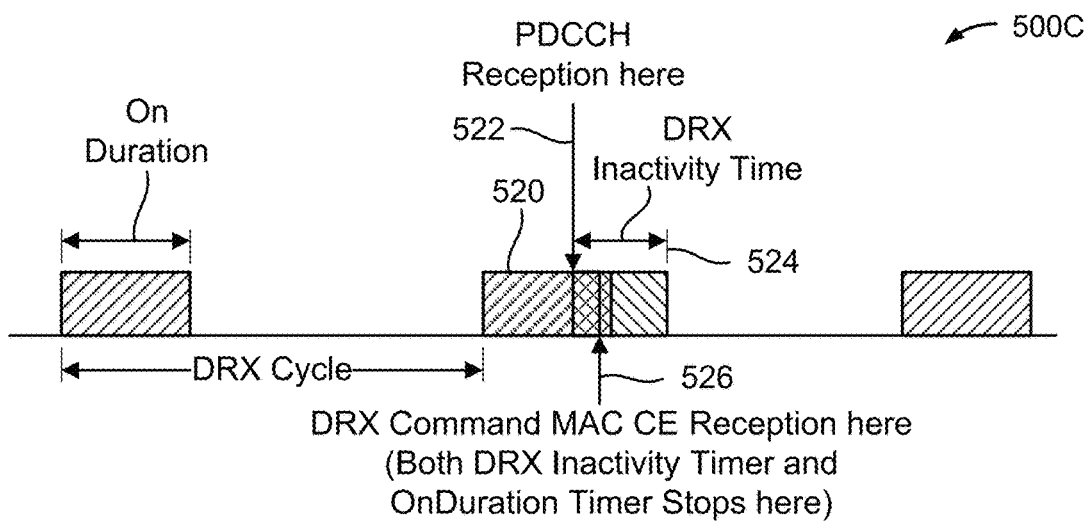

FIGS. 5A to 5C illustrate example DRX configurations, according to aspects of the disclosure. FIG. 5A illustrates an example DRX configuration 500A in which a long DRX cycle (the time from the start of one ON duration to the start of the next ON duration) is configured and no PDCCH is received during the cycle. FIG. 5B illustrates an example DRX configuration 500B in which a long DRX cycle is configured and a PDCCH is received during an ON duration 510 of the second DRX cycle illustrated. Note that the ON duration 510 ends at time 512. However, the time that the UE is awake/active (the "active time") is extended to time 514 based on the length of the DRX inactivity timer and the time at which the PDCCH is received. Specifically, when the PDCCH is received, the UE starts the DRX inactivity timer and stays in the active state until the expiration of that timer (which is reset each time a PDCCH is received during the active time).

FIG. 5C illustrates an example DRX configuration 500C in which a long DRX cycle is configured and a PDCCH and a DRX command MAC control element (MAC-CE) are received during an ON duration 520 of the second DRX cycle illustrated. Note that the active time beginning during ON duration 520 would normally end at time 524 due to the reception of the PDCCH at time 522 and the subsequent expiration of the DRX inactivity timer at time 524, as discussed above with reference to FIG. 5B. However, in the example of FIG. 5C, the active time is shortened to time 526 based on the time at which the DRX command MAC-CE, which instructs the UE to terminate the DRX inactivity timer and the ON duration timer, is received.

In greater detail, the active time of a DRX cycle is the time during which the UE is considered to be monitoring the PDCCH. The active time may include the time during which the ON duration timer is running, the DRX inactivity timer is running, the DRX retransmission timer is running, the MAC contention resolution timer is running, a scheduling request has been sent on the PUCCH and is pending, an uplink grant for a pending HARQ retransmission can occur and there is data in the corresponding HARQ buffer, or a PDCCH indicating a new transmission addressed to the cell radio network temporary identifier (C-RNTI) of the UE has not been received after successful reception of a random access response (RAR) for the preamble not selected by the UE. And, in non-contention-based random access, after receiving the RAR, the UE should be in an active state until the PDCCH indicating new transmission addressed to the C-RNTI of the UE is received.

For certain types of positioning, a UE is expected to transmit an UL-PRS upon reception of a DL-PRS, or is expected to receive a DL-PRS upon transmission of an UL-PRS. For example, in a network-initiated RTT positioning procedure, upon reception of an RTT measurement signal (e.g., a DL-PRS), the UE is expected to respond with an RTT response signal (e.g., an UL-PRS). Similarly, in a UE-initiated RTT positioning procedure, upon transmission of an RTT measurement signal (e.g., an UL-PRS), the UE is expected to measure an RTT response signal (e.g., a DL-PRS).

Figure 6A:
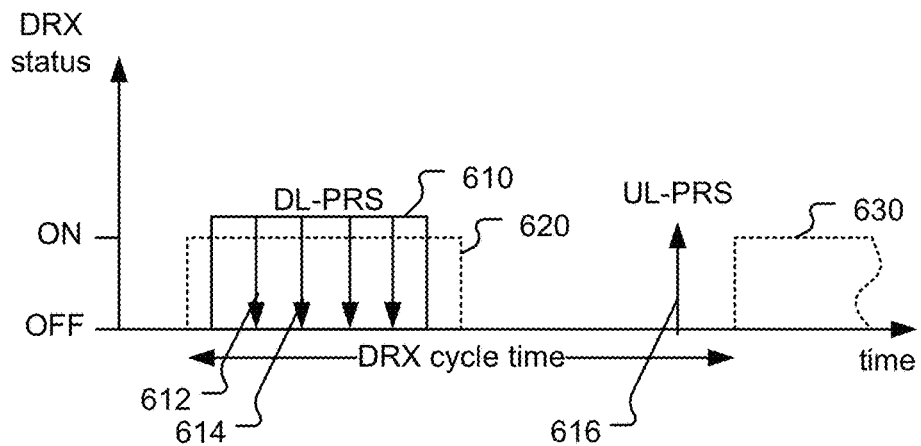
FIGS. 6A to 6C illustrate various relative timings of downlink positioning reference signals (DL-PRS) and DRX ON times that may occur depending upon scheduled DL-PRS and scheduled DRX cycles.
Figure 6B:
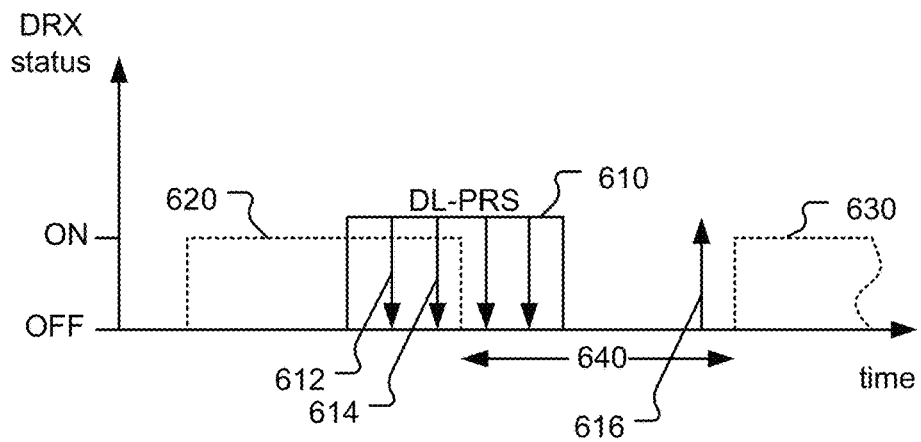
Figure 6C:
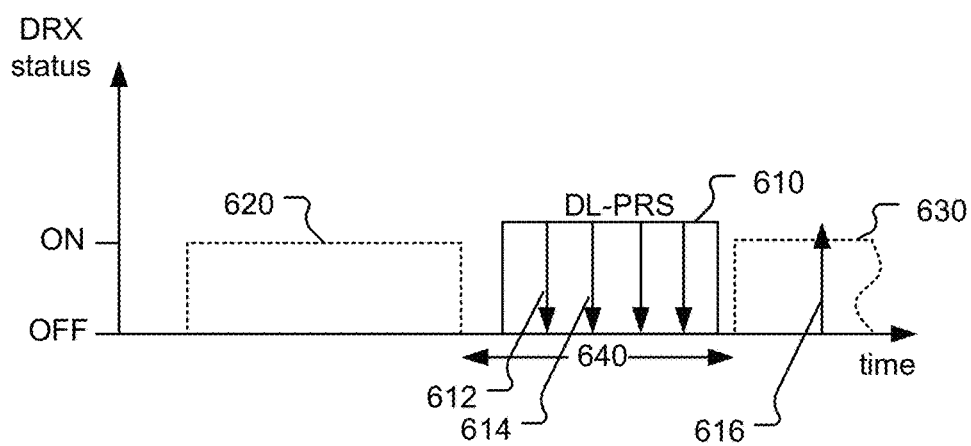

FIGS. 6A to 6C illustrate various relative timings of DL-PRS and DRX ON times that may occur depending upon scheduled DL-PRS and scheduled DRX cycles. As shown in FIG. 6A, in a full-overlap relationship of DL-PRS and DRX ON time, a scheduled DL-PRS occasion 610 (including two repetitions of two DL-PRS resources 612, 614, only the first repetitions of which are labeled for clarity) occurs completely within a scheduled DRX ON time window 620. Thus, the DL-PRS occasion 610 fully overlaps with the DRX ON time window 620. The DRX ON time may refer to the DRX ON duration (configured by the DRX ON Duration Timer) or DRX active time (as discussed above, with an active time range being more dynamic, e.g., not determined at the beginning of a DL-PRS occasion 610). A DRX cycle time is shown as the time from a beginning of the DRX ON time window 620 to a beginning of a next DRX ON time window 630.

As shown in FIG. 6B, in a partial-overlap relationship of DL-PRS and DRX ON time, a scheduled DL-PRS occasion 610 partially overlaps with a DRX ON time window 620. One portion of the DL-PRS occasion 610 overlaps with a portion of the DRX ON time window 620 and another portion of the DL-PRS occasion 610 overlaps with a portion of a DRX OFF time window 640. As shown in FIG. 6C, a zero-overlap relationship of DL-PRS and DRX ON time, a scheduled DL-PRS occasion 610 does not overlap at all with a DRX ON time window 620, and instead fully overlaps with a DRX OFF time window 640.

The examples illustrated in FIGS. 6A to 6B are equally applicable to UL-PRS. That is, the DL-PRS occasions 610 can simply be replaced by UL-PRS occasions.

In the examples of FIGS. 6A to 6B, the DL-PRS occasions 610 may correspond to an RTT measurement signal, in which case, the UE is expected to transmit an UL-PRS upon reception of the DL-PRS occasion 610. This is illustrated by UL-PRS resource 616. When the UE is configured for DRX, if reception of a DL-PRS occasion 610 or transmission of an UL-PRS resource 616 falls within a DRX active time, then the UE is expected to behave as in the following table. The UL/DL-PRS transmission/reception configuration defined in Table 1 applies independently for periodic (P), semi-persistent (SP), and aperiodic (A) PRS.

TABLE 1

| Overlap Condition | Measurement Behavior |
|---|---|
| PRS occasion is fully within DRX ON time | 1. Transmit/receive entire UL/DL-PRS occasion |
| PRS occasion partially overlaps with DRX ON time | 1. Transmit/receive entire UL/DL-PRS occasion<br>2. Transmit/receive a subset of UL/DL-PRS resources<br>3. Skip this UL/DL-PRS occasion |
| PRS occasion is fully within DRX OFF time | 1. Transmit/receive entire UL/DL-PRS occasion<br>2. Skip this UL/DL-PRS occasion |

For the second option (in the second row of Table 1), the UE can select a subset of PRS resources (e.g., DL-PRS resources 612, 614) within one DL-PRS occasion (e.g., DL-PRS occasion 610) based on the resource set and/or frequency layer and/or number of TRPs and PRS repetition factors, spatial-multiplexing, etc. For example, given a set of UL/DL-PRS resources denoted "AABBCC," the UE may transmit/receive the UL/DL-PRS resources denoted "AABBC." As another example, given a set of UL/DL-PRS resources denoted "ABCABC," the UE may transmit/receive at least one set of the UL/DL-PRS resources denoted "ABC."

Alternatively, the UE can select the subset of DL-PRS resources within one DL-PRS occasion that fall within the DRX ON duration and/or DRX active time. Note that as described above, the active time range is more dynamic and may not be determined at the beginning of an DL-PRS occasion.

As noted above, the UL/DL-PRS transmission/reception rules defined in Table 1 are independent of each other. That means, the same rules apply to DL-PRS and UL-PRS, regardless of whether they are the DL-PRS and UL-PRS of the same positioning session (e.g., RTT). This may result in inconsistencies regarding what should be transmitted and/or measured. For example, in an RTT procedure, the DL-PRS should be received from, and the UL-PRS transmitted to, the same base station (more specifically the same TRP) to enable the determination of the Rx-Tx time difference measurement. By applying the pruning rules defined in Table 1, however, this constraint is not considered, and may result in an incomplete Rx-Tx time difference measurement. For example, a UE may measure DL-PRS, but because the corresponding UL-PRS would be transmitted during DRX OFF time (as in FIGS. 6A and 6B), the UL-PRS may be dropped. Similarly, a UE may transmit an UL-PRS, but because the corresponding DL-PRS is scheduled at least partially during DRX OFF time, the DL-PRS may not be received.

The present disclosure provides techniques to select a subset of UL/DL-PRS to transmit/receive considering the constraint between DL-PRS and UL-PRS with respect to the interaction of the DRX cycle. The constraint may be defined by the positioning method (e.g., RTT) and/or the spatial relationship.

Figure 7A:
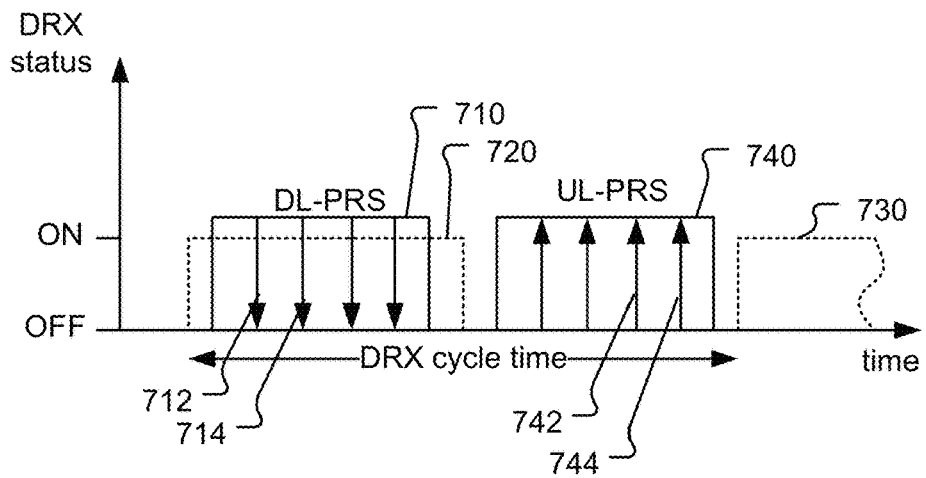
FIGS. 7A to 7C illustrate various relative timings of pairs of DL-PRS and uplink PRS (UL-PRS) with respect to DRX ON times, according to aspects of the disclosure.
Figure 7B:
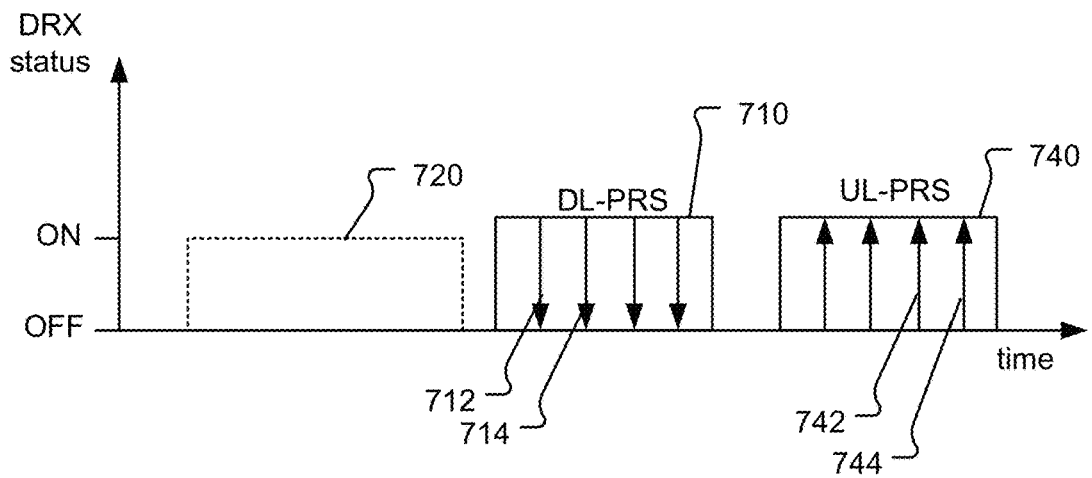
Figure 7C:
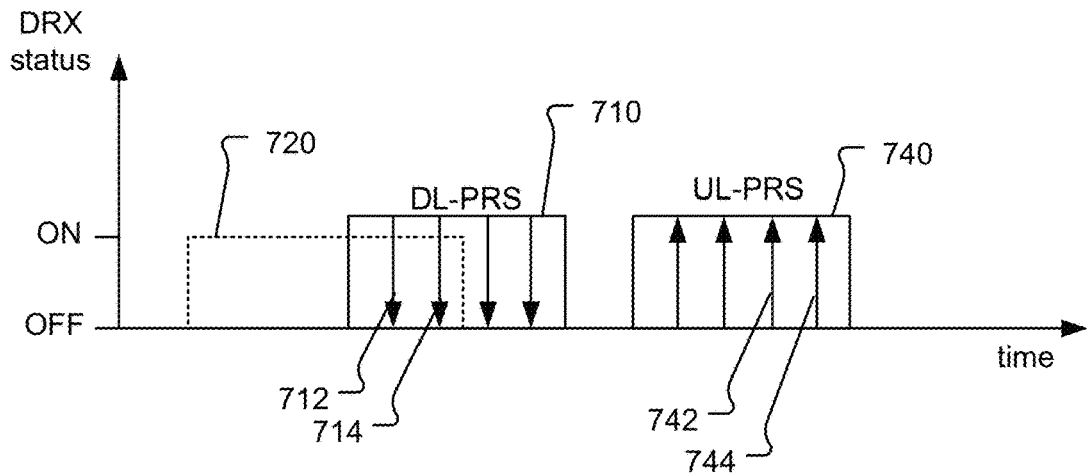

Referring to the positioning method constraint, a downlink and uplink PRS pair can be bundled together as one downlink and uplink PRS for a Rx-Tx time difference measurement that should be provided within one Rx-Tx time difference measurement report (also referred to as a PRS report). FIGS. 7A to 7C illustrate various relative timings of pairs of DL-PRS and UL-PRS with respect to DRX ON times, according to aspects of the disclosure. As shown in FIG. 7A, a scheduled DL-PRS occasion 710 (including two repetitions of two DL-PRS resources 712, 714, only the first repetitions of which are labeled for clarity) occurs entirely within a scheduled DRX ON time window 720. A DRX cycle time is shown as the time from a beginning of the DRX ON time window 720 to a beginning of a next DRX ON time window 730. An UL-PRS occasion 740 (including two repetitions of two UL-PRS resources 742, 744, only the second repetitions of which are labeled for clarity) is scheduled between the DRX ON time windows 720 and 730. In the example of FIG. 7A, the UL-PRS occasion 740 is entirely within DRX OFF time, but as will be appreciated, this need not be the case, and the UL-PRS occasion 740 may partially overlap or be entirely within the next DRX ON time window 730. The DL-PRS occasion 710 and the UL-PRS occasion 740 may be bundled as a pair of PRS due, for example, to being associated with the same TRP (e.g., the same TRP may transmit the DL-PRS occasion 710 and schedule uplink resources for the UL-PRS occasion 740) and sufficiently close to each other in time.

As shown in FIG. 7B, the scheduled DL-PRS occasion 710 does not overlap at all with the DRX ON time window 720, and instead, is entirely within DRX OFF time. The UL-PRS occasion 740 is scheduled after the DL-PRS occasion 710 and, in the example of FIG. 7B, is entirely within DRX OFF time. However, as will be appreciated, this need not be the case, and the UL-PRS occasion 740 may partially overlap or be entirely within the next DRX ON time window (not shown in FIG. 7B). The DL-PRS occasion 710 and UL-PRS occasion 740 may be bundled as a pair of PRS due, for example, to being associated with the same TRP and sufficiently close to each other in time.

As shown in FIG. 7C, the scheduled DL-PRS occasion 710 partially overlaps with a DRX ON time window 720. The UL-PRS occasion 740 is scheduled after the DRX ON time window 720 and is entirely within DRX OFF time. However, as will be appreciated, this need not be the case, and the UL-PRS occasion 740 may partially overlap or be entirely within the next DRX ON time window (not shown in FIG. 7C). The DL-PRS occasion 710 and the UL-PRS occasion 740 may be bundled as a pair of PRS due, for example, to being associated with the same TRP and sufficiently close to each other in time.

As will be appreciated, the scenarios illustrated in FIGS. 7A to 7C may be reversed, and the UL-PRS occasion 740 may be scheduled before the DL-PRS occasion 710.

Once downlink and uplink PRS have been paired, the general procedure is for the UE to select one type of PRS (downlink or uplink) as the PRS to apply the pruning rule(s) to (referred to as "PRS1") and then apply the pruning rule(s) based on the selected PRS' relation to DRX ON time. The UE then prunes the non-selected type of PRS (referred to as "PRS2") based on the bundling condition(s).

For example, a UE may select DL-PRS as PRS1, and a DL-PRS occasion may be within, partially within, or outside of DRX ON time. The UE then determines which DL-PRS (PRS1) resources of the DL-PRS occasion it should measure based on PRS pruning rules, such as shown in Table 1. For the corresponding UL-PRS (PRS2) in the bundled PRS pair, the UE should transmit the UL-PRS (PRS2) regardless of the overlapping condition for the UL-PRS.

The same applies to UL-PRS. For example, a UE may select an UL-PRS as PRS1, and the UL-PRS occasion may be within, partially within, or outside of DRX ON time. The UE then determines which UL-PRS (PRS1) resources of the UL-PRS occasion it should transmit based on PRS pruning rules, such as shown in Table 1. For the corresponding DL-PRS (PRS2) in the bundled PRS pair, the UE should measure the DL-PRS (PRS2) regardless of the overlapping condition for the DL-PRS.

The selection of which type of PRS (uplink or downlink) should be selected as PRS1 can be based on different factors. A first factor is the DRX overlap condition. For example, priorities may be assigned to the DRX overlap condition such that fully within DRX ON time is given the highest priority, partially within DRX ON time is given the next highest priority, and entirely outside of DRX ON time is given the lowest priority. In that case, if, for example, one type of PRS (e.g., DL-PRS) is entirely within DRX ON time and the other type of PRS (e.g., UL-PRS) is not, then the first type of PRS will be selected as PRS1 and the second type of PRS will be selected as PRS2. Alternatively, the priority order could be reversed. In that case, if, for example, one type of PRS (e.g., DL-PRS) is entirely outside of DRX ON time and the other type of PRS (e.g., UL-PRS) is not, then the first type of PRS will be selected as PRS1 and the second type of PRS will be selected as PRS2.

A second factor is the timing order of the PRS. In this case, the first occurring (or first scheduled) PRS may be selected as PRS1 and the second occurring (or second scheduled) PRS may be selected as PRS2. For example, if, as in the examples of FIGS. 6A to 6B, DL-PRS are scheduled first, then the DL-PRS is selected as PRS1. Alternatively, this order could be reversed, and the later occurring PRS may be selected as PRS1 and the first occurring PRS may be selected as PRS2.

A third factor is the PRS periodicity. In this case, aperiodic PRS (e.g., on-demand PRS) may have a higher priority than semi-persistent PRS, which may have a higher priority than periodic PRS. For example, if the UL-PRS in a pair of PRS is aperiodic and the DL-PRS is periodic, then the UL-PRS would be selected as PRS1 and the DL-PRS would be selected as PRS2. Alternatively, this order could be reversed, and periodic PRS may have a higher priority than semi-persistent PRS, which may have a higher priority than aperiodic PRS.

In some cases, there may be other considerations to apply. For example, the UE may cancel an UL-PRS transmission if the corresponding DL-PRS is measured ahead of the uplink transmission and the link quality is below some threshold (e.g., an RSRP, SINR, etc. threshold).

Another approach for the positioning method constraint is to apply the pruning rule (e.g., as defined in Table 1) for DL-PRS and UL-PRS independently with respect to their overlap conditions with DRX (as is currently done) and obtain two set of PRS. That is, the UE would prune the scheduled set of DL-PRS occasions according to their DRX overlap conditions and, likewise, prune the scheduled set of UL-PRS occasions according to their DRX overlap conditions. Once these two sets have been selected, the UE can determine the union or intersection of the two sets given the bundling conditions. That is, the UE can determine which DL-PRS can be paired with which UL-PRS based on their bundling conditions, such as whether they are associated with the same TRP, whether they are sufficiently close in time, whether they have a QCL relationship, and the like.

Referring to the spatial relationship (i.e., QCL relationship) constraint, currently, an UL-PRS can be quasi-co-located with (i.e., spatially related to) a DL-PRS, but the reverse is not supported. More specifically, different types of reference signals can provide a spatial relationship for other types of reference signals. Currently, an SS/PBCH can be a QCL source for a DL-PRS, CSI-RS, SRS, or UL-PRS. A CSI-RS can be a QCL source for an SRS or UL-PRS. A DL-PRS can be a QCL source for another DL-PRS or an UL-PRS. An SRS can be a QCL source for another SRS or an UL-PRS. An UL-PRS can be a QCL source for another UL-PRS. The present disclosure extends the current QCL relationships to include the case where an UL-PRS can be a QCL source for a DL-PRS and considers the QCL relationship as a constraint during an RTT procedure.

The QCL relationship between an UL-PRS and DL-PRS is an implicit bundling condition between the UL-PRS and the DL-PRS. Specifically, if two PRS resources are quasi-co-located (the constraint) and the second PRS resource (in time) uses the beam searching/refinement of the first PRS resource, then the second PRS resource should not be received or transmitted if the first PRS resource is not transmitted or received. For example, if a DL-PRS is quasi-co-located with an UL-PRS (meaning the UL-PRS is the QCL source for the DL-PRS), the UL-PRS will be transmitted first and the receiving TRP will use properties of the UL-PRS (e.g., the direction of the receive beam used to receive the UL-PRS) to transmit the corresponding DL-PRS. Since the UL-PRS is scheduled to be transmitted first and the DL-PRS uses the beam searching/refinement of the UL-PRS, then the UE should not measure the DL-PRS if it does not transmit the UL-PRS.

Figure 8A:
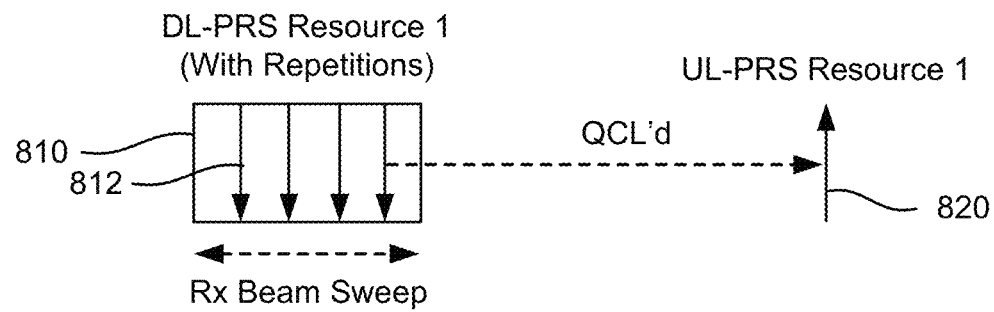
FIG. 8A illustrates an example scenario in which a DL-PRS resource is scheduled before an UL-PRS resource, according to aspects of the disclosure.

The order of downlink and uplink (i.e., whether DL-PRS are received first or UL-PRS are transmitted first) may be important for QCL purposes. In the case of DL-PRS being scheduled first, an UL-PRS resource may be quasi-co-located with a DL-PRS resource and any repetitions of the DL-PRS resource, as shown in FIG. 8A. Specifically, FIG. 8A illustrates an example scenario in which a DL-PRS resource 810 is scheduled before an UL-PRS resource 820. In the example of FIG. 8A, the DL-PRS resource 810 (labeled "DL-PRS Resource 1") is comprised of a plurality of repetitions 812. The UL-PRS resource 820 (labeled "UL-PRS Resource 1") may be quasi-co-located ("QCL'd") with the DL-PRS resource 810. The UE may perform a downlink receive ("Rx") beam sweep to determine, among other things, the direction of the best beam on which to receive the DL-PRS resource 810. The uplink transmit beam would depend on the results of the downlink receive beam sweep (e.g., the direction) and any refinement at the UE. The UE could then transmit the UL-PRS resource 820 in the determined direction.

Figure 8B:
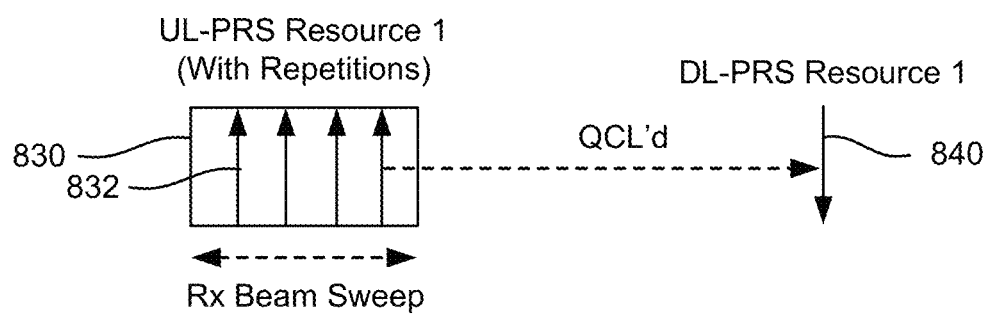
FIG. 8B illustrates an example scenario in which an UL-PRS resource is scheduled before a DL-PRS resource, according to aspects of the disclosure.

In the case of the UL-PRS being scheduled first, a DL-PRS resource may be quasi-co-located with an UL-PRS resource and any repetitions of the UL-PRS resource, as shown in FIG. 8B. Specifically, FIG. 8B illustrates an example scenario in which an UL-PRS resource 830 is scheduled before a DL-PRS resource 840. In the example of FIG. 8B, the UL-PRS resource 830 (labeled "UL-PRS Resource 1") is comprised of a plurality of repetitions 832. The DL-PRS resource 840 (labeled "DL-PRS Resource 1") may be quasi-co-located ("QCL'd") with the UL-PRS resource 830. The TRP may perform an uplink receive ("Rx") beam sweep to determine, among other things, the direction of the best beam on which to receive the UL-PRS resource 830. The downlink transmit beam would depend on the results of the uplink receive beam sweep (e.g., the direction) and refinement at the TRP.

Note that in FIGS. 6A to 8B, the repetitions of the DL-PRS resources (e.g., repetitions of DL-PRS resources 612, 614, 712, 714, 812) and the UL-PRS resources (e.g., repetitions of UL-PRS resources 742, 744) may be transmitted on different transmit beams.

Considering again the case of an overlap condition with a DRX cycle, the pruning rule could be defined as follows. If one of the PRS resources in the bundled pair is selected to be measured (or transmitted), then the other PRS in the bundled pair should be transmitted (or received). Another option is only if all of the PRS are selected, then transmit and measure the UL/DL-PRS in the bundled pair.

Figure 9:
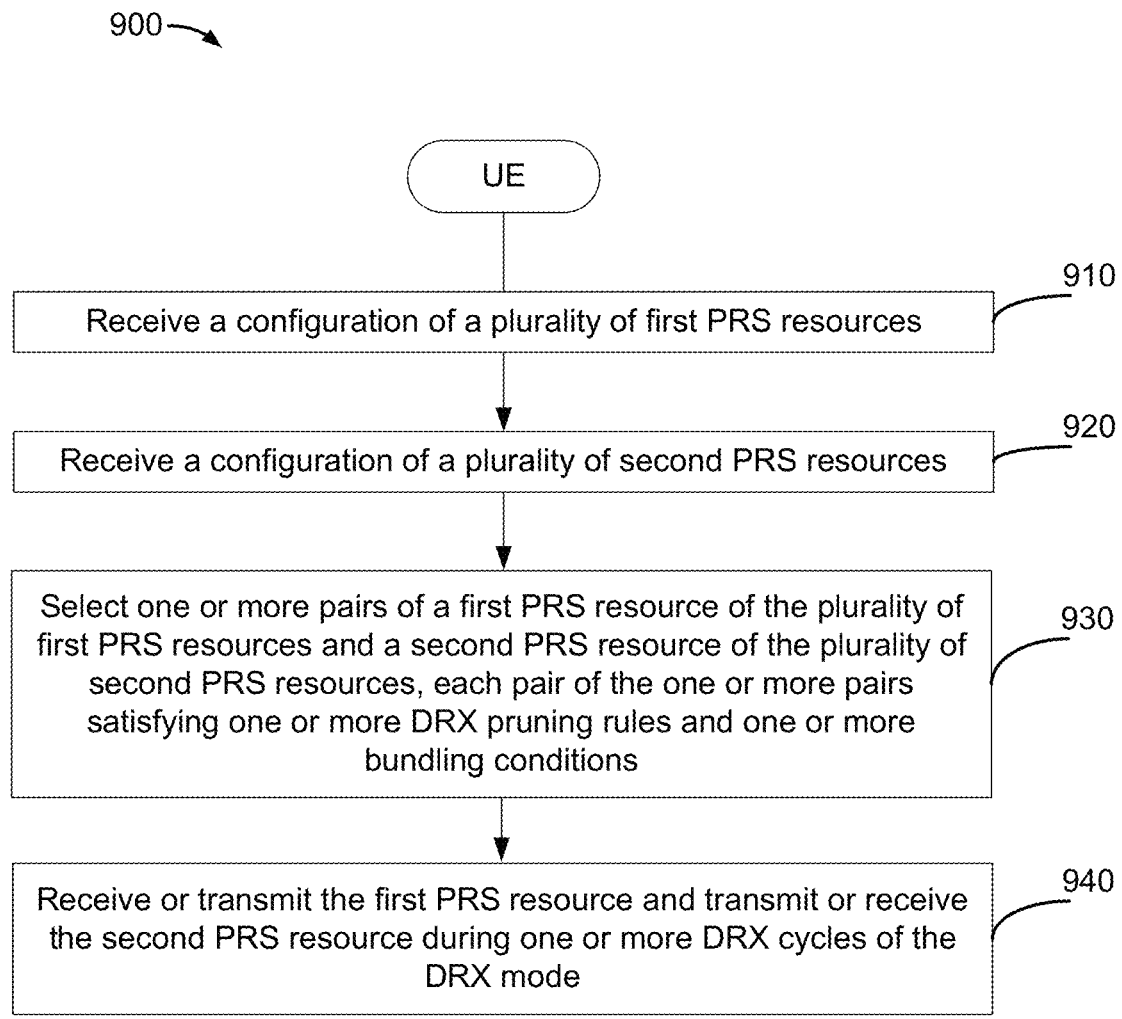
FIG. 9 illustrates an example method of wireless communication, according to aspects of the disclosure.

FIG. 9 illustrates an example method 900 of wireless communication, according to aspects of the disclosure. In an aspect, the method 900 may be performed by a UE configured to operate in DRX mode (e.g., any of the UEs described herein).

At 910, the UE receives a configuration of a plurality of first PRS resources (e.g., downlink or uplink PRS resources). In an aspect, operation 910 may be performed by the one or more WWAN transceivers 310, the one or more processors 332, memory 340, and/or the positioning component 342.

At 920, the UE receives a configuration of a plurality of second PRS resources (e.g., uplink or downlink PRS resources). In an aspect, operation 920 may be performed by the one or more WWAN transceivers 310, the one or more processors 332, memory 340, and/or the positioning component 342.

At 930, the UE selects one or more pairs of a first PRS resource of the plurality of first PRS resources and a second PRS resource of the plurality of second PRS resources, each pair of the one or more pairs satisfying one or more DRX pruning rules and one or more bundling conditions. In an aspect, operation 930 may be performed by the one or more WWAN transceivers 310, the one or more processors 332, memory 340, and/or the positioning component 342.

At 940, the UE receives or transmits the first PRS resource and transmits or receives the second PRS resource during one or more DRX cycles of the DRX mode. In an aspect, operation 940 may be performed by the one or more WWAN transceivers 310, the one or more processors 332, memory 340, and/or the positioning component 342.

As will be appreciated, a technical advantage of the method 900 is improved positioning performance due to the bundling of uplink and downlink PRS resources when operating in DRX mode.

In the detailed description above it can be seen that different features are grouped together in examples. This manner of disclosure should not be understood as an intention that the example clauses have more features than are explicitly mentioned in each clause. Rather, the various aspects of the disclosure may include fewer than all features of an individual example clause disclosed. Therefore, the following clauses should hereby be deemed to be incorporated in the description, wherein each clause by itself can stand as a separate example. Although each dependent clause can refer in the clauses to a specific combination with one of the other clauses, the aspect(s) of that dependent clause are not limited to the specific combination. It will be appreciated that other example clauses can also include a combination of the dependent clause aspect(s) with the subject matter of any other dependent clause or independent clause or a combination of any feature with other dependent and independent clauses. The various aspects disclosed herein expressly include these combinations, unless it is explicitly expressed or can be readily inferred that a specific combination is not intended (e.g., contradictory aspects, such as defining an element as both an insulator and a conductor). Furthermore, it is also intended that aspects of a clause can be included in any other independent clause, even if the clause is not directly dependent on the independent clause.

Implementation examples are described in the following numbered clauses:

Clause 1. A method of wireless communication performed by a user equipment (UE) configured to operate in discontinuous reception (DRX) mode, comprising: receiving a configuration of a plurality of first positioning reference signal (PRS) resources; receiving a configuration of a plurality of second PRS resources; selecting one or more pairs of a first PRS resource of the plurality of first PRS resources and a second PRS resource of the plurality of second PRS resources, each pair of the one or more pairs satisfying one or more DRX pruning rules and one or more bundling conditions; and receiving or transmitting the first PRS resource and transmitting or receiving the second PRS resource during one or more DRX cycles of the DRX mode.

Clause 2. The method of clause 1, wherein the selecting comprises: selecting the first PRS resource of each pair of the one or more pairs based on the one or more DRX pruning rules and one or more priority rules; and selecting the second PRS resource of each pair of the one or more pairs based on the one or more bundling conditions.

Clause 3. The method of clause 2, wherein the one or more priority rules comprise: based on the first PRS resource being scheduled entirely within DRX ON time and the second PRS resource being scheduled at least partially outside DRX ON time, select the first PRS resource from the plurality of first PRS resources, based on the first PRS resource being scheduled partially within DRX ON time and partially outside of DRX ON time and the second PRS resource being scheduled entirely outside of DRX ON time, select the first PRS resource from the plurality of first PRS resources, or any combination thereof.

Clause 4. The method of any of clauses 2 to 3, wherein the one or more priority rules comprise: based on the first PRS resource being scheduled entirely outside of DRX ON time and the second PRS resource being scheduled at least partially within DRX ON time, select the first PRS resource from the plurality of first PRS resources, based on the first PRS resource being scheduled partially within DRX ON time and partially outside of DRX ON time and the second PRS resource being scheduled entirely within DRX ON time, select the first PRS resource from the plurality of first PRS resources, or any combination thereof.

Clause 5. The method of any of clauses 2 to 4, wherein the one or more priority rules comprise: based on the first PRS resource being scheduled before the second PRS resource, select the first PRS resource from the plurality of first PRS resources, or based on the first PRS resource being scheduled after the second PRS resource, select the first PRS resource from the plurality of first PRS resources.

Clause 6. The method of any of clauses 2 to 5, wherein the one or more priority rules comprise: based on the first PRS resource being aperiodic and the second PRS resource being semi-persistent or periodic, select the first PRS resource from the plurality of first PRS resources, based on the first PRS resource being semi-persistent and the second PRS resource being periodic, select the first PRS resource from the plurality of first PRS resources, or any combination thereof.

Clause 7. The method of any of clauses 2 to 6, wherein the one or more priority rules comprise: based on the first PRS resource being periodic and the second PRS resource being semi-persistent or aperiodic, select the first PRS resource from the plurality of first PRS resources, based on the first PRS resource being semi-persistent and the second PRS resource being aperiodic, select the first PRS resource from the plurality of first PRS resources, or any combination thereof.

Clause 8. The method of any of clauses 2 to 7, wherein: the first PRS resource is part of a PRS occasion, and the one or more DRX pruning rules comprise one or more of: based on the PRS occasion being entirely within DRX ON time, selecting all PRS resource of the PRS occasion, including the first PRS resource, based on the PRS occasion being partially within DRX ON time and partially within DRX OFF time, selecting all PRS resource of the PRS occasion, including the first PRS resource, based on the PRS occasion being partially within DRX ON time and partially within DRX OFF time and the first PRS resource being within DRX ON time, selecting at least the first PRS resource of the PRS occasion, based on the PRS occasion being entirely outside of DRX ON time, selecting all PRS resource of the PRS occasion, including the first PRS resource.

Clause 9. The method of any of clauses 1 to 8, wherein the transmitting comprises: transmitting or receiving the second PRS resource regardless of the second PRS resource overlapping a DRX OFF time.

Clause 10. The method of any of clauses 1 to 9, further comprising: determining a set of the plurality of first PRS resources satisfying the one or more DRX pruning rules; determining a set of the plurality of second PRS resources satisfying the one or more DRX pruning rules; and determining an intersection set or union set of the set of the plurality of first PRS resources and the set of the plurality of second PRS resources, wherein the one or more pairs are selected from the intersection set or the union set based on the one or more bundling conditions.

Clause 11. The method of any of clauses 1 to 10, wherein the one or more bundling conditions comprise: the first PRS resource and the second PRS resource being associated with the same transmission-reception point (TRP), the first PRS resource and the second PRS resource being scheduled within a threshold period of time of each other, a quasi-co-location (QCL) relationship between the first PRS resource and the second PRS resource, or any combination thereof.

Clause 12. The method of clause 11, wherein the QCL relationship indicates that the second PRS resource is to be transmitted or received only if the first PRS resource is received or transmitted.

Clause 13. The method of any of clauses 11 to 12, wherein: the first PRS resource comprises a downlink PRS (DL-PRS) resource, the second PRS resource comprises an uplink PRS (UL-PRS) resource, the DL-PRS resource is configured with repetitions, and an uplink transmit beam on which the UL-PRS resource is transmitted is based on a result of a downlink receive beam sweep of the repetitions of the DL-PRS resource.

Clause 14. The method of any of clauses 11 to 12, wherein: the first PRS resource comprises an UL-PRS resource, the second PRS resource comprises a DL-PRS resource, the UL-PRS resource is configured with repetitions, and a downlink transmit beam on which the DL-PRS resource is transmitted is based on a result of an uplink receive beam sweep of the repetitions of the UL-PRS resource.

Clause 15. The method of any of clauses 11 to 14, wherein the selecting comprises: selecting the first PRS resource of each pair of the one or more pairs based on the one or more DRX pruning rules; and selecting the second PRS resource of each pair of the one or more pairs based on the QCL relationship between the first PRS resource and the second PRS resource.

Clause 16. The method of any of clauses 1 to 12, 14, and 15, wherein: the first PRS resource comprises an UL-PRS resource, the second PRS resource comprises a DL-PRS resource, the receiving or transmitting the first PRS resource comprises transmitting the UL-PRS resource, and transmitting or receiving the second PRS resource comprises receiving the DL-PRS resource.

Clause 17. The method of clause 16, wherein: the configuration of the plurality of first PRS resources is received from a serving base station, and the configuration of the plurality of second PRS resources is received from a location server.

Clause 18. The method of any of clauses 1 to 13 and 15 to 17, wherein: the first PRS resource comprises a DL-PRS resource, the second PRS resource comprises an UL-PRS resource, the receiving or transmitting the first PRS resource comprises receiving the DL-PRS resource, and transmitting or receiving the second PRS resource comprises transmitting the UL-PRS resource.

Clause 19. The method of clause 18, wherein: the configuration of the plurality of first PRS resources is received from a location server, and the configuration of the plurality of second PRS resources is received from a serving base station.

Clause 20. The method of any of clauses 18 to 19, further comprising: reporting, to a positioning entity, a time difference between reception of the DL-PRS resource and transmission of the UL-PRS resource.

Clause 21. An apparatus comprising a memory, at least one transceiver, and at least one processor communicatively coupled to the memory and the at least one transceiver, the memory, the at least one transceiver, and the at least one processor configured to perform a method according to any of clauses 1 to 20.

Clause 22. An apparatus comprising means for performing a method according to any of clauses 1 to 20.

Clause 23. A non-transitory computer-readable medium storing computer-executable instructions, the computer-executable comprising at least one instruction for causing a computer or processor to perform a method according to any of clauses 1 to 20.

Additional implementation examples are described in the following numbered clauses:

Clause 1. A method of wireless communication performed by a user equipment (UE) configured to operate in discontinuous reception (DRX) mode, comprising: receiving a configuration of a plurality of first positioning reference signal (PRS) resources; receiving a configuration of a plurality of second PRS resources; selecting one or more pairs of a first PRS resource of the plurality of first PRS resources and a second PRS resource of the plurality of second PRS resources, each pair of the one or more pairs satisfying one or more DRX pruning rules and one or more bundling conditions; and receiving or transmitting the first PRS resource and transmitting or receiving the second PRS resource during one or more DRX cycles of the DRX mode.

Clause 2. The method of clause 1, wherein selecting the one or more pairs comprises: selecting the first PRS resource of each pair of the one or more pairs based on the one or more DRX pruning rules and one or more priority rules; and selecting the second PRS resource of each pair of the one or more pairs based on the one or more bundling conditions.

Clause 3. The method of clause 2, wherein the one or more priority rules comprise: selecting the first PRS resource from the plurality of first PRS resources based on the first PRS resource being scheduled entirely within DRX ON time and the second PRS resource being scheduled at least partially outside DRX ON time.

Clause 4. The method of any of clauses 2 to 3, wherein the one or more priority rules comprise: selecting the first PRS resource from the plurality of first PRS resources based on the first PRS resource being scheduled partially within DRX ON time and partially outside of DRX ON time and the second PRS resource being scheduled entirely outside of DRX ON time.

Clause 5. The method of any of clauses 2 to 4, wherein the one or more priority rules comprise: selecting the first PRS resource from the plurality of first PRS resources based on the first PRS resource being scheduled entirely outside of DRX ON time and the second PRS resource being scheduled at least partially within DRX ON time.

Clause 6. The method of any of clauses 2 to 5, wherein the one or more priority rules comprise: selecting the first PRS resource from the plurality of first PRS resources based on the first PRS resource being scheduled partially within DRX ON time and partially outside of DRX ON time and the second PRS resource being scheduled entirely within DRX ON time.

Clause 7. The method of any of clauses 2 to 6, wherein the one or more priority rules comprise: selecting the first PRS resource from the plurality of first PRS resources based on the first PRS resource being scheduled before the second PRS resource.

Clause 8. The method of any of clauses 2 to 7, wherein the one or more priority rules comprise: selecting the first PRS resource from the plurality of first PRS resources based on the first PRS resource being scheduled after the second PRS resource.

Clause 9. The method of any of clauses 2 to 8, wherein the one or more priority rules comprise: selecting the first PRS resource from the plurality of first PRS resources based on the first PRS resource being aperiodic and the second PRS resource being semi-persistent or periodic.

Clause 10. The method of any of clauses 2 to 9, wherein the one or more priority rules comprise: selecting the first PRS resource from the plurality of first PRS resources based on the first PRS resource being semi-persistent and the second PRS resource being periodic.

Clause 11. The method of any of clauses 2 to 10, wherein the one or more priority rules comprise: selecting the first PRS resource from the plurality of first PRS resources based on the first PRS resource being periodic and the second PRS resource being semi-persistent or aperiodic.

Clause 12. The method of any of clauses 2 to 11, wherein the one or more priority rules comprise: selecting the first PRS resource from the plurality of first PRS resources based on the first PRS resource being semi-persistent and the second PRS resource being aperiodic.

Clause 13. The method of any of clauses 2 to 12, wherein: the first PRS resource is part of a PRS occasion, and the one or more DRX pruning rules comprise: selecting all PRS resource of the PRS occasion, including the first PRS resource, based on the PRS occasion being entirely within DRX ON time, selecting all PRS resource of the PRS occasion, including the first PRS resource, based on the PRS occasion being partially within DRX ON time and partially within DRX OFF time, selecting at least the first PRS resource of the PRS occasion based on the PRS occasion being partially within DRX ON time and partially within DRX OFF time and the first PRS resource being within DRX ON time, selecting all PRS resource of the PRS occasion, including the first PRS resource, based on the PRS occasion being entirely outside of DRX ON time, or any combination thereof.

Clause 14. The method of any of clauses 1 to 13, wherein transmitting or receiving the second PRS resource comprises: transmitting or receiving the second PRS resource regardless of the second PRS resource overlapping a DRX OFF time.

Clause 15. The method of any of clauses 1 to 14, further comprising: determining a set of the plurality of first PRS resources satisfying the one or more DRX pruning rules; determining a set of the plurality of second PRS resources satisfying the one or more DRX pruning rules; and determining an intersection set or union set of the set of the plurality of first PRS resources and the set of the plurality of second PRS resources, wherein the one or more pairs are selected from the intersection set or the union set based on the one or more bundling conditions.

Clause 16. The method of any of clauses 1 to 15, wherein the one or more bundling conditions comprise: the first PRS resource and the second PRS resource being associated with the same transmission-reception point (TRP), the first PRS resource and the second PRS resource being scheduled within a threshold period of time of each other, a quasi-co-location (QCL) relationship between the first PRS resource and the second PRS resource, or any combination thereof.

Clause 17. The method of clause 16, wherein the second PRS resource is to be transmitted or received only if the first PRS resource is received or transmitted.

Clause 18. The method of any of clauses 16 to 17, wherein: the first PRS resource comprises a downlink PRS (DL-PRS) resource, the second PRS resource comprises an uplink PRS (UL-PRS) resource, the DL-PRS resource is configured to be transmitted as a plurality of repetitions on a plurality of transmit beams, and an uplink transmit beam on which the UL-PRS resource is transmitted is based on a result of a downlink receive beam sweep of the plurality of repetitions.

Clause 19. The method of any of clauses 16 to 17, wherein: the first PRS resource comprises an UL-PRS resource, the second PRS resource comprises a DL-PRS resource, the UL-PRS resource is configured to be transmitted as a plurality of repetitions on a plurality of transmit beams, and a downlink transmit beam on which the DL-PRS resource is transmitted is based on a result of an uplink receive beam sweep of the plurality of repetitions.

Clause 20. The method of any of clauses 16 to 19, wherein selecting the one or more pairs comprises: selecting the first PRS resource of each pair of the one or more pairs based on the one or more DRX pruning rules; and selecting the second PRS resource of each pair of the one or more pairs based on the QCL relationship between the first PRS resource and the second PRS resource.

Clause 21. A user equipment (UE), comprising: a memory; at least one transceiver; and at least one processor communicatively coupled to the memory and the at least one transceiver, the at least one processor configured to: receive, via the at least one transceiver, a configuration of a plurality of first positioning reference signal (PRS) resources; receive, via the at least one transceiver, a configuration of a plurality of second PRS resources; select one or more pairs of a first PRS resource of the plurality of first PRS resources and a second PRS resource of the plurality of second PRS resources, each pair of the one or more pairs satisfying one or more DRX pruning rules and one or more bundling conditions; and receive or transmit, via the at least one transceiver, the first PRS resource and transmit or receive, via the at least one transceiver, the second PRS resource during one or more DRX cycles of the DRX mode.

Clause 22. The UE of clause 21, wherein the at least one processor configured to select the one or more pairs comprises the at least one processor configured to: select the first PRS resource of each pair of the one or more pairs based on the one or more DRX pruning rules and one or more priority rules; and select the second PRS resource of each pair of the one or more pairs based on the one or more bundling conditions.

Clause 23. The UE of clause 22, wherein the one or more priority rules comprise: select the first PRS resource from the plurality of first PRS resources based on the first PRS resource being scheduled entirely within DRX ON time and the second PRS resource being scheduled at least partially outside DRX ON time.

Clause 24. The UE of any of clauses 22 to 23, wherein the one or more priority rules comprise: select the first PRS resource from the plurality of first PRS resources based on the first PRS resource being scheduled partially within DRX ON time and partially outside of DRX ON time and the second PRS resource being scheduled entirely outside of DRX ON time.

Clause 25. The UE of any of clauses 22 to 24, wherein the one or more priority rules comprise: select the first PRS resource from the plurality of first PRS resources based on the first PRS resource being scheduled entirely outside of DRX ON time and the second PRS resource being scheduled at least partially within DRX ON time.

Clause 26. The UE of any of clauses 22 to 25, wherein the one or more priority rules comprise: select the first PRS resource from the plurality of first PRS resources based on the first PRS resource being scheduled partially within DRX ON time and partially outside of DRX ON time and the second PRS resource being scheduled entirely within DRX ON time.

Clause 27. The UE of any of clauses 22 to 26, wherein the one or more priority rules comprise: select the first PRS resource from the plurality of first PRS resources based on the first PRS resource being scheduled before the second PRS resource.

Clause 28. The UE of any of clauses 22 to 27, wherein the one or more priority rules comprise: select the first PRS resource from the plurality of first PRS resources based on the first PRS resource being scheduled after the second PRS resource.

Clause 29. The UE of any of clauses 22 to 28, wherein the one or more priority rules comprise: select the first PRS resource from the plurality of first PRS resources based on the first PRS resource being aperiodic and the second PRS resource being semi-persistent or periodic.

Clause 30. The UE of any of clauses 22 to 29, wherein the one or more priority rules comprise: select the first PRS resource from the plurality of first PRS resources based on the first PRS resource being semi-persistent and the second PRS resource being periodic.

Clause 31. The UE of any of clauses 22 to 30, wherein the one or more priority rules comprise: select the first PRS resource from the plurality of first PRS resources based on the first PRS resource being periodic and the second PRS resource being semi-persistent or aperiodic.

Clause 32. The UE of any of clauses 22 to 31, wherein the one or more priority rules comprise: select the first PRS resource from the plurality of first PRS resources based on the first PRS resource being semi-persistent and the second PRS resource being aperiodic.

Clause 33. The UE of any of clauses 22 to 32, wherein: the first PRS resource is part of a PRS occasion, and the one or more DRX pruning rules comprise: select all PRS resource of the PRS occasion, including the first PRS resource, based on the PRS occasion being entirely within DRX ON time, select all PRS resource of the PRS occasion, including the first PRS resource, based on the PRS occasion being partially within DRX ON time and partially within DRX OFF time, select at least the first PRS resource of the PRS occasion based on the PRS occasion being partially within DRX ON time and partially within DRX OFF time and the first PRS resource being within DRX ON time, select all PRS resource of the PRS occasion, including the first PRS resource, based on the PRS occasion being entirely outside of DRX ON time, or any combination thereof.

Clause 34. The UE of any of clauses 21 to 33, wherein the at least one processor configured to transmit or receive the second PRS resource comprises the at least one processor configured to: transmit or receive, via the at least one transceiver, the second PRS resource regardless of the second PRS resource overlapping a DRX OFF time.

Clause 35. The UE of any of clauses 21 to 34, wherein the at least one processor is further configured to: determine a set of the plurality of first PRS resources satisfying the one or more DRX pruning rules; determine a set of the plurality of second PRS resources satisfying the one or more DRX pruning rules; and determine an intersection set or union set of the set of the plurality of first PRS resources and the set of the plurality of second PRS resources, wherein the one or more pairs are selected from the intersection set or the union set based on the one or more bundling conditions.

Clause 36. The UE of any of clauses 21 to 35, wherein the one or more bundling conditions comprise: the first PRS resource and the second PRS resource being associated with the same transmission-reception point (TRP), the first PRS resource and the second PRS resource being scheduled within a threshold period of time of each other, a quasi-co-location (QCL) relationship between the first PRS resource and the second PRS resource, or any combination thereof.

Clause 37. The UE of clause 36, wherein the second PRS resource is to be transmitted or received only if the first PRS resource is received or transmitted.

Clause 38. The UE of any of clauses 36 to 37, wherein: the first PRS resource comprises a downlink PRS (DL-PRS) resource, the second PRS resource comprises an uplink PRS (UL-PRS) resource, the DL-PRS resource is configured to be transmitted as a plurality of repetitions on a plurality of transmit beams, and an uplink transmit beam on which the UL-PRS resource is transmitted is based on a result of a downlink receive beam sweep of the plurality of repetitions.

Clause 39. The UE of any of clauses 36 to 37, wherein: the first PRS resource comprises an UL-PRS resource, the second PRS resource comprises a DL-PRS resource, the UL-PRS resource is configured to be transmitted as a plurality of repetitions on a plurality of transmit beams, and a downlink transmit beam on which the DL-PRS resource is transmitted is based on a result of an uplink receive beam sweep of the plurality of repetitions.

Clause 40. The UE of any of clauses 36 to 39, wherein the at least one processor configured to select the one or more pairs comprises the at least one processor configured to: select the first PRS resource of each pair of the one or more pairs based on the one or more DRX pruning rules; and select the second PRS resource of each pair of the one or more pairs based on the QCL relationship between the first PRS resource and the second PRS resource.

Clause 41. A user equipment (UE), comprising: means for receiving a configuration of a plurality of first positioning reference signal (PRS) resources; means for receiving a configuration of a plurality of second PRS resources; means for selecting one or more pairs of a first PRS resource of the plurality of first PRS resources and a second PRS resource of the plurality of second PRS resources, each pair of the one or more pairs satisfying one or more DRX pruning rules and one or more bundling conditions; and means for receiving or transmitting the first PRS resource and means for transmitting or receiving the second PRS resource during one or more DRX cycles of the DRX mode.

Clause 42. The UE of clause 41, wherein the means for selecting the one or more pairs comprises: means for selecting the first PRS resource of each pair of the one or more pairs based on the one or more DRX pruning rules and one or more priority rules; and means for selecting the second PRS resource of each pair of the one or more pairs based on the one or more bundling conditions.

Clause 43. The UE of clause 42, wherein the one or more priority rules comprise: selecting the first PRS resource from the plurality of first PRS resources based on the first PRS resource being scheduled entirely within DRX ON time and the second PRS resource being scheduled at least partially outside DRX ON time.

Clause 44. The UE of any of clauses 42 to 43, wherein the one or more priority rules comprise: selecting the first PRS resource from the plurality of first PRS resources based on the first PRS resource being scheduled partially within DRX ON time and partially outside of DRX ON time and the second PRS resource being scheduled entirely outside of DRX ON time.

Clause 45. The UE of any of clauses 42 to 44, wherein the one or more priority rules comprise: selecting the first PRS resource from the plurality of first PRS resources based on the first PRS resource being scheduled entirely outside of DRX ON time and the second PRS resource being scheduled at least partially within DRX ON time.

Clause 46. The UE of any of clauses 42 to 45, wherein the one or more priority rules comprise: selecting the first PRS resource from the plurality of first PRS resources based on the first PRS resource being scheduled partially within DRX ON time and partially outside of DRX ON time and the second PRS resource being scheduled entirely within DRX ON time.

Clause 47. The UE of any of clauses 42 to 46, wherein the one or more priority rules comprise: selecting the first PRS resource from the plurality of first PRS resources based on the first PRS resource being scheduled before the second PRS resource.

Clause 48. The UE of any of clauses 42 to 47, wherein the one or more priority rules comprise: selecting the first PRS resource from the plurality of first PRS resources based on the first PRS resource being scheduled after the second PRS resource.

Clause 49. The UE of any of clauses 42 to 48, wherein the one or more priority rules comprise: selecting the first PRS resource from the plurality of first PRS resources based on the first PRS resource being aperiodic and the second PRS resource being semi-persistent or periodic.

Clause 50. The UE of any of clauses 42 to 49, wherein the one or more priority rules comprise: selecting the first PRS resource from the plurality of first PRS resources based on the first PRS resource being semi-persistent and the second PRS resource being periodic.

Clause 51. The UE of any of clauses 42 to 50, wherein the one or more priority rules comprise: selecting the first PRS resource from the plurality of first PRS resources based on the first PRS resource being periodic and the second PRS resource being semi-persistent or aperiodic.

Clause 52. The UE of any of clauses 42 to 51, wherein the one or more priority rules comprise: selecting the first PRS resource from the plurality of first PRS resources based on the first PRS resource being semi-persistent and the second PRS resource being aperiodic.

Clause 53. The UE of any of clauses 42 to 52, wherein: the first PRS resource is part of a PRS occasion, and the one or more DRX pruning rules comprise: selecting all PRS resource of the PRS occasion, including the first PRS resource, based on the PRS occasion being entirely within DRX ON time, selecting all PRS resource of the PRS occasion, including the first PRS resource, based on the PRS occasion being partially within DRX ON time and partially within DRX OFF time, selecting at least the first PRS resource of the PRS occasion based on the PRS occasion being partially within DRX ON time and partially within DRX OFF time and the first PRS resource being within DRX ON time, selecting all PRS resource of the PRS occasion, including the first PRS resource, based on the PRS occasion being entirely outside of DRX ON time, or any combination thereof.

Clause 54. The UE of any of clauses 41 to 53, wherein the means for transmitting or receiving the second PRS resource comprises: means for transmitting or receiving the second PRS resource regardless of the second PRS resource overlapping a DRX OFF time.

Clause 55. The UE of any of clauses 41 to 54, further comprising: means for determining a set of the plurality of first PRS resources satisfying the one or more DRX pruning rules; means for determining a set of the plurality of second PRS resources satisfying the one or more DRX pruning rules; and means for determining an intersection set or union set of the set of the plurality of first PRS resources and the set of the plurality of second PRS resources, wherein the one or more pairs are selected from the intersection set or the union set based on the one or more bundling conditions.

Clause 56. The UE of any of clauses 41 to 55, wherein the one or more bundling conditions comprise: the first PRS resource and the second PRS resource being associated with the same transmission-reception point (TRP), the first PRS resource and the second PRS resource being scheduled within a threshold period of time of each other, a quasi-co-location (QCL) relationship between the first PRS resource and the second PRS resource, or any combination thereof.

Clause 57. The UE of clause 56, wherein the second PRS resource is to be transmitted or received only if the first PRS resource is received or transmitted.

Clause 58. The UE of any of clauses 56 to 57, wherein: the first PRS resource comprises a downlink PRS (DL-PRS) resource, the second PRS resource comprises an uplink PRS (UL-PRS) resource, the DL-PRS resource is configured to be transmitted as a plurality of repetitions on a plurality of transmit beams, and an uplink transmit beam on which the UL-PRS resource is transmitted is based on a result of a downlink receive beam sweep of the plurality of repetitions.

Clause 59. The UE of any of clauses 56 to 57, wherein: the first PRS resource comprises an UL-PRS resource, the second PRS resource comprises a DL-PRS resource, the UL-PRS resource is configured to be transmitted as a plurality of repetitions on a plurality of transmit beams, and a downlink transmit beam on which the DL-PRS resource is transmitted is based on a result of an uplink receive beam sweep of the plurality of repetitions.

Clause 60. The UE of any of clauses 56 to 59, wherein the means for selecting the one or more pairs comprises: means for selecting the first PRS resource of each pair of the one or more pairs based on the one or more DRX pruning rules; and means for selecting the second PRS resource of each pair of the one or more pairs based on the QCL relationship between the first PRS resource and the second PRS resource.

Clause 61. A non-transitory computer-readable medium storing computer-executable instructions that, when executed by a user equipment (UE), cause the UE to: receive a configuration of a plurality of first positioning reference signal (PRS) resources; receive a configuration of a plurality of second PRS resources; select one or more pairs of a first PRS resource of the plurality of first PRS resources and a second PRS resource of the plurality of second PRS resources, each pair of the one or more pairs satisfying one or more DRX pruning rules and one or more bundling conditions; and receive or transmit the first PRS resource and transmit or receive the second PRS resource during one or more DRX cycles of the DRX mode.

Clause 62. The non-transitory computer-readable medium of clause 61, wherein the computer-executable instructions that, when executed by the UE, cause the UE to select the one or more pairs comprise computer-executable instructions that, when executed by the UE, cause the UE to: select the first PRS resource of each pair of the one or more pairs based on the one or more DRX pruning rules and one or more priority rules; and select the second PRS resource of each pair of the one or more pairs based on the one or more bundling conditions.

Clause 63. The non-transitory computer-readable medium of clause 62, wherein the one or more priority rules comprise: select the first PRS resource from the plurality of first PRS resources based on the first PRS resource being scheduled entirely within DRX ON time and the second PRS resource being scheduled at least partially outside DRX ON time.

Clause 64. The non-transitory computer-readable medium of any of clauses 62 to 63, wherein the one or more priority rules comprise: select the first PRS resource from the plurality of first PRS resources based on the first PRS resource being scheduled partially within DRX ON time and partially outside of DRX ON time and the second PRS resource being scheduled entirely outside of DRX ON time.

Clause 65. The non-transitory computer-readable medium of any of clauses 62 to 64, wherein the one or more priority rules comprise: select the first PRS resource from the plurality of first PRS resources based on the first PRS resource being scheduled entirely outside of DRX ON time and the second PRS resource being scheduled at least partially within DRX ON time.

Clause 66. The non-transitory computer-readable medium of any of clauses 62 to 65, wherein the one or more priority rules comprise: select the first PRS resource from the plurality of first PRS resources based on the first PRS resource being scheduled partially within DRX ON time and partially outside of DRX ON time and the second PRS resource being scheduled entirely within DRX ON time.

Clause 67. The non-transitory computer-readable medium of any of clauses 62 to 66, wherein the one or more priority rules comprise: select the first PRS resource from the plurality of first PRS resources based on the first PRS resource being scheduled before the second PRS resource.

Clause 68. The non-transitory computer-readable medium of any of clauses 62 to 67, wherein the one or more priority rules comprise: select the first PRS resource from the plurality of first PRS resources based on the first PRS resource being scheduled after the second PRS resource.

Clause 69. The non-transitory computer-readable medium of any of clauses 62 to 68, wherein the one or more priority rules comprise: select the first PRS resource from the plurality of first PRS resources based on the first PRS resource being aperiodic and the second PRS resource being semi-persistent or periodic.

Clause 70. The non-transitory computer-readable medium of any of clauses 62 to 69, wherein the one or more priority rules comprise: select the first PRS resource from the plurality of first PRS resources based on the first PRS resource being semi-persistent and the second PRS resource being periodic.

Clause 71. The non-transitory computer-readable medium of any of clauses 62 to 70, wherein the one or more priority rules comprise: select the first PRS resource from the plurality of first PRS resources based on the first PRS resource being periodic and the second PRS resource being semi-persistent or aperiodic.

Clause 72. The non-transitory computer-readable medium of any of clauses 62 to 71, wherein the one or more priority rules comprise: select the first PRS resource from the plurality of first PRS resources based on the first PRS resource being semi-persistent and the second PRS resource being aperiodic.

Clause 73. The non-transitory computer-readable medium of any of clauses 62 to 72, wherein: the first PRS resource is part of a PRS occasion, and the one or more DRX pruning rules comprise: select all PRS resource of the PRS occasion, including the first PRS resource, based on the PRS occasion being entirely within DRX ON time, select all PRS resource of the PRS occasion, including the first PRS resource, based on the PRS occasion being partially within DRX ON time and partially within DRX OFF time, select at least the first PRS resource of the PRS occasion based on the PRS occasion being partially within DRX ON time and partially within DRX OFF time and the first PRS resource being within DRX ON time, select all PRS resource of the PRS occasion, including the first PRS resource, based on the PRS occasion being entirely outside of DRX ON time, or any combination thereof.

Clause 74. The non-transitory computer-readable medium of any of clauses 61 to 73, wherein the computer-executable instructions that, when executed by the UE, cause the UE to transmit or receive the second PRS resource comprise computer-executable instructions that, when executed by the UE, cause the UE to: transmit or receive the second PRS resource regardless of the second PRS resource overlapping a DRX OFF time.

Clause 75. The non-transitory computer-readable medium of any of clauses 61 to 74, further comprising computer-executable instructions that, when executed by the UE, cause the UE to: determine a set of the plurality of first PRS resources satisfying the one or more DRX pruning rules; determine a set of the plurality of second PRS resources satisfying the one or more DRX pruning rules; and determine an intersection set or union set of the set of the plurality of first PRS resources and the set of the plurality of second PRS resources, wherein the one or more pairs are selected from the intersection set or the union set based on the one or more bundling conditions.

Clause 76. The non-transitory computer-readable medium of any of clauses 61 to 75, wherein the one or more bundling conditions comprise: the first PRS resource and the second PRS resource being associated with the same transmission-reception point (TRP), the first PRS resource and the second PRS resource being scheduled within a threshold period of time of each other, a quasi-co-location (QCL) relationship between the first PRS resource and the second PRS resource, or any combination thereof.

Clause 77. The non-transitory computer-readable medium of clause 76, wherein the second PRS resource is to be transmitted or received only if the first PRS resource is received or transmitted.

Clause 78. The non-transitory computer-readable medium of any of clauses 76 to 77, wherein: the first PRS resource comprises a downlink PRS (DL-PRS) resource, the second PRS resource comprises an uplink PRS (UL-PRS) resource, the DL-PRS resource is configured to be transmitted as a plurality of repetitions on a plurality of transmit beams, and an uplink transmit beam on which the UL-PRS resource is transmitted is based on a result of a downlink receive beam sweep of the plurality of repetitions.

Clause 79. The non-transitory computer-readable medium of any of clauses 76 to 77, wherein: the first PRS resource comprises an UL-PRS resource, the second PRS resource comprises a DL-PRS resource, the UL-PRS resource is configured to be transmitted as a plurality of repetitions on a plurality of transmit beams, and a downlink transmit beam on which the DL-PRS resource is transmitted is based on a result of an uplink receive beam sweep of the plurality of repetitions.

Clause 80. The non-transitory computer-readable medium of any of clauses 76 to 79, wherein the computer-executable instructions that, when executed by the UE, cause the UE to select the one or more pairs comprise computer-executable instructions that, when executed by the UE, cause the UE to: select the first PRS resource of each pair of the one or more pairs based on the one or more DRX pruning rules; and select the second PRS resource of each pair of the one or more pairs based on the QCL relationship between the first PRS resource and the second PRS resource.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an ASIC, a field-programmable gate array (FPGA), or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, for example, a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in random access memory (RAM), flash memory, read-only memory (ROM), erasable programmable ROM (EPROM), electrically erasable programmable ROM (EEPROM), registers, hard disk, a removable disk, a CD-ROM, or any other form of storage medium known in the art. An example storage medium is coupled to the processor such that the processor can read information from, and write information to, the storage medium. In the alternative, the storage medium may be integral to the processor. The processor and the storage medium may reside in an ASIC. The ASIC may reside in a user terminal (e.g., UE). In the alternative, the processor and the storage medium may reside as discrete components in a user terminal.

In one or more example aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method of wireless communication performed by a user equipment (UE) configured to operate in discontinuous reception (DRX) mode, comprising:
   receiving a configuration of a plurality of first positioning reference signal (PRS) resources;
   receiving a configuration of a plurality of second PRS resources;
   selecting one or more pairs of a first PRS resource of the plurality of first PRS resources and a second PRS resource of the plurality of second PRS resources, each pair of the one or more pairs satisfying one or more DRX pruning rules and one or more bundling conditions; and
   receiving the first PRS resource and transmitting the second PRS resource, or transmitting the first PRS resource and receiving the second PRS resource, during one or more DRX cycles of the DRX mode.

2. The method of claim 1, wherein selecting the one or more pairs comprises:
   selecting the first PRS resource of each pair of the one or more pairs based on the one or more DRX pruning rules and one or more priority rules; and
   selecting the second PRS resource of each pair of the one or more pairs based on the one or more bundling conditions.

3. The method of claim 2, wherein the one or more priority rules comprise:
   selecting the first PRS resource from the plurality of first PRS resources based on the first PRS resource being scheduled entirely within DRX ON time and the second PRS resource being scheduled at least partially outside DRX ON time.

4. The method of claim 2, wherein the one or more priority rules comprise:
   selecting the first PRS resource from the plurality of first PRS resources based on the first PRS resource being scheduled partially within DRX ON time and partially outside of DRX ON time and the second PRS resource being scheduled entirely outside of DRX ON time.

5. The method of claim 2, wherein the one or more priority rules comprise:
   selecting the first PRS resource from the plurality of first PRS resources based on the first PRS resource being scheduled entirely outside of DRX ON time and the second PRS resource being scheduled at least partially within DRX ON time.

6. The method of claim 2, wherein the one or more priority rules comprise:
   selecting the first PRS resource from the plurality of first PRS resources based on the first PRS resource being scheduled partially within DRX ON time and partially outside of DRX ON time and the second PRS resource being scheduled entirely within DRX ON time.

7. The method of claim 2, wherein the one or more priority rules comprise:
   selecting the first PRS resource from the plurality of first PRS resources based on the first PRS resource being scheduled before the second PRS resource, select the first PRS resource from the plurality of first PRS resources.

8. The method of claim 2, wherein the one or more priority rules comprise:
   selecting the first PRS resource from the plurality of first PRS resources based on the first PRS resource being scheduled after the second PRS resource.

9. The method of claim 2, wherein the one or more priority rules comprise:
   selecting the first PRS resource from the plurality of first PRS resources based on the first PRS resource being aperiodic and the second PRS resource being semi-persistent or periodic.

10. The method of claim 2, wherein the one or more priority rules comprise:
    selecting the first PRS resource from the plurality of first PRS resources based on the first PRS resource being semi-persistent and the second PRS resource being periodic.

11. The method of claim 2, wherein the one or more priority rules comprise:
    selecting the first PRS resource from the plurality of first PRS resources based on the first PRS resource being periodic and the second PRS resource being semi-persistent or aperiodic.

12. The method of claim 2, wherein the one or more priority rules comprise:
    selecting the first PRS resource from the plurality of first PRS resources based on the first PRS resource being semi-persistent and the second PRS resource being aperiodic.

13. The method of claim 2, wherein:
    the first PRS resource is part of a PRS occasion, and
    the one or more DRX pruning rules comprise:
       selecting all PRS resource of the PRS occasion, including the first PRS resource, based on the PRS occasion being entirely within DRX ON time,
       selecting all PRS resource of the PRS occasion, including the first PRS resource, based on the PRS occasion being partially within DRX ON time and partially within DRX OFF time, selecting at least the first PRS resource of the PRS occasion based on the PRS occasion being partially within DRX ON time and partially within DRX OFF time and the first PRS resource being within DRX ON time,
selecting all PRS resource of the PRS occasion, including the first PRS resource, based on the PRS occasion being entirely outside of DRX ON time,
or any combination thereof.

14. The method of claim 1, wherein transmitting or receiving the second PRS resource comprises:
transmitting or receiving the second PRS resource regardless of the second PRS resource overlapping a DRX OFF time.

15. The method of claim 1, further comprising:
determining a set of the plurality of first PRS resources satisfying the one or more DRX pruning rules;
determining a set of the plurality of second PRS resources satisfying the one or more DRX pruning rules; and
determining an intersection set or union set of the set of the plurality of first PRS resources and the set of the plurality of second PRS resources,
wherein the one or more pairs are selected from the intersection set or the union set based on the one or more bundling conditions.

16. The method of claim 1, wherein the one or more bundling conditions comprise:
the first PRS resource and the second PRS resource being associated with the same transmission-reception point (TRP),
the first PRS resource and the second PRS resource being scheduled within a threshold period of time of each other,
a quasi-co-location (QCL) relationship between the first PRS resource and the second PRS resource,
or any combination thereof.

17. The method of claim 16, wherein the second PRS resource is to be transmitted or received only if the first PRS resource is received or transmitted.

18. The method of claim 16, wherein:
the first PRS resource comprises a downlink PRS (DL-PRS) resource,
the second PRS resource comprises an uplink PRS (UL-PRS) resource,
the DL-PRS resource is configured to be transmitted as a plurality of repetitions on a plurality of transmit beams, and
an uplink transmit beam on which the UL-PRS resource is transmitted is based on a result of a downlink receive beam sweep of the plurality of repetitions.

19. The method of claim 16, wherein:
the first PRS resource comprises an UL-PRS resource,
the second PRS resource comprises a DL-PRS resource,
the UL-PRS resource is configured to be transmitted as a plurality of repetitions on a plurality of transmit beams, and
a downlink transmit beam on which the DL-PRS resource is transmitted is based on a result of an uplink receive beam sweep of the plurality of repetitions.

20. The method of claim 16, wherein selecting the one or more pairs comprises:
selecting the first PRS resource of each pair of the one or more pairs based on the one or more DRX pruning rules; and
selecting the second PRS resource of each pair of the one or more pairs based on the QCL relationship between the first PRS resource and the second PRS resource.

21. A user equipment (UE), comprising:
one or more memories;
one or more transceivers; and
one or more processors communicatively coupled to the one or more memories and the one or more transceivers, the one or more processors, either alone or in combination, configured to:
receive, via the one or more transceivers, a configuration of a plurality of first positioning reference signal (PRS) resources;
receive, via the one or more transceivers, a configuration of a plurality of second PRS resources;
select one or more pairs of a first PRS resource of the plurality of first PRS resources and a second PRS resource of the plurality of second PRS resources, each pair of the one or more pairs satisfying one or more DRX pruning rules and one or more bundling conditions; and
receive, via the one or more transceivers, the first PRS resource and transmit, via the one or more transceivers, the second PRS resource, or transmit, via the one or more transceivers, the first PRS resource and receive, via the one or more transceivers, the second PRS resource, during one or more DRX cycles of the DRX mode.

22. The UE of claim 21, wherein the one or more processors, either alone or in combination, configured to select the one or more pairs comprises the one or more processors, either alone or in combination, configured to:
select the first PRS resource of each pair of the one or more pairs based on the one or more DRX pruning rules and one or more priority rules; and
select the second PRS resource of each pair of the one or more pairs based on the one or more bundling conditions.

23. The UE of claim 22, wherein the one or more priority rules comprise:
select the first PRS resource from the plurality of first PRS resources based on the first PRS resource being scheduled entirely within DRX ON time and the second PRS resource being scheduled at least partially outside DRX ON time,
select the first PRS resource from the plurality of first PRS resources based on the first PRS resource being scheduled partially within DRX ON time and partially outside of DRX ON time and the second PRS resource being scheduled entirely outside of DRX ON time,
select the first PRS resource from the plurality of first PRS resources based on the first PRS resource being scheduled entirely outside of DRX ON time and the second PRS resource being scheduled at least partially within DRX ON time,
select the first PRS resource from the plurality of first PRS resources based on the first PRS resource being scheduled partially within DRX ON time and partially outside of DRX ON time and the second PRS resource being scheduled entirely within DRX ON time,
select the first PRS resource from the plurality of first PRS resources based on the first PRS resource being scheduled before the second PRS resource,
select the first PRS resource from the plurality of first PRS resources based on the first PRS resource being scheduled after the second PRS resource,
select the first PRS resource from the plurality of first PRS resources based on the first PRS resource being aperiodic and the second PRS resource being semi-persistent or periodic, select the first PRS resource from the plurality of first PRS resources based on the first PRS resource being semi-persistent and the second PRS resource being periodic, select the first PRS resource from the plurality of first PRS resources based on the first PRS resource being periodic and the second PRS resource being semi-persistent or aperiodic, select the first PRS resource from the plurality of first PRS resources based on the first PRS resource being semi-persistent and the second PRS resource being aperiodic, or any combination thereof.

24. The UE of claim 22, wherein:
the first PRS resource is part of a PRS occasion, and
the one or more DRX pruning rules comprise:
  select all PRS resource of the PRS occasion, including the first PRS resource, based on the PRS occasion being entirely within DRX ON time,
  select all PRS resource of the PRS occasion, including the first PRS resource, based on the PRS occasion being partially within DRX ON time and partially within DRX OFF time,
  select at least the first PRS resource of the PRS occasion based on the PRS occasion being partially within DRX ON time and partially within DRX OFF time and the first PRS resource being within DRX ON time,
  select all PRS resource of the PRS occasion, including the first PRS resource, based on the PRS occasion being entirely outside of DRX ON time,
  or any combination thereof.

25. The UE of claim 21, wherein the one or more processors, either alone or in combination, configured to transmit or receive the second PRS resource comprises the one or more processors, either alone or in combination, configured to:
  transmit or receive, via the one or more transceivers, the second PRS resource regardless of the second PRS resource overlapping a DRX OFF time.

26. The UE of claim 21, wherein the one or more processors, either alone or in combination, are further configured to:
  determine a set of the plurality of first PRS resources satisfying the one or more DRX pruning rules;
  determine a set of the plurality of second PRS resources satisfying the one or more DRX pruning rules; and
  determine an intersection set or union set of the set of the plurality of first PRS resources and the set of the plurality of second PRS resources,
  wherein the one or more pairs are selected from the intersection set or the union set based on the one or more bundling conditions.

27. The UE of claim 21, wherein the one or more bundling conditions comprise:
  the first PRS resource and the second PRS resource being associated with the same transmission-reception point (TRP),
  the first PRS resource and the second PRS resource being scheduled within a threshold period of time of each other,
  a quasi-co-location (QCL) relationship between the first PRS resource and the second PRS resource,
  or any combination thereof.

28. The UE of claim 27, wherein the second PRS resource is to be transmitted or received only if the first PRS resource is received or transmitted.

29. A user equipment (UE), comprising:
  means for receiving a configuration of a plurality of first positioning reference signal (PRS) resources;
  means for receiving a configuration of a plurality of second PRS resources;
  means for selecting one or more pairs of a first PRS resource of the plurality of first PRS resources and a second PRS resource of the plurality of second PRS resources, each pair of the one or more pairs satisfying one or more DRX pruning rules and one or more bundling conditions; and
  means for receiving the first PRS resource and means for transmitting the second PRS resource, or means for transmitting the first PRS resource and means for receiving the second PRS resource, during one or more DRX cycles of the DRX mode.

30. A non-transitory computer-readable medium storing computer-executable instructions that, when executed by a user equipment (UE), cause the UE to:
  receive a configuration of a plurality of first positioning reference signal (PRS) resources;
  receive a configuration of a plurality of second PRS resources;
  select one or more pairs of a first PRS resource of the plurality of first PRS resources and a second PRS resource of the plurality of second PRS resources, each pair of the one or more pairs satisfying one or more DRX pruning rules and one or more bundling conditions; and
  receive or transmit the first PRS resource and transmit or receive the second PRS resource, or transmit the first PRS resource and receive the second PRS resource, during one or more DRX cycles of the DRX mode.

* * * * *